(12) United States Patent
Zhou

(10) Patent No.: US 12,493,923 B2
(45) Date of Patent: Dec. 9, 2025

(54) INFORMATION PUSHING METHOD AND APPARATUS BASED ON PANORAMIC IMAGE, AND MOBILE TERMINAL

(71) Applicant: Tencent Technology (Shenzhen) Company Limited, Shenzhen (CN)

(72) Inventor: Qi Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 161 days.

(21) Appl. No.: 18/133,903

(22) Filed: Apr. 12, 2023

(65) Prior Publication Data

US 2023/0245264 A1 Aug. 3, 2023

Related U.S. Application Data

(63) Continuation of application No. PCT/CN2022/102107, filed on Jun. 29, 2022.

(30) Foreign Application Priority Data

Jul. 26, 2021 (CN) .......................... 202110846859.4

(51) Int. Cl.
*H04N 23/698* (2023.01)
*G06Q 30/0241* (2023.01)
(Continued)

(52) U.S. Cl.
CPC .......... *G06T 3/16* (2024.01); *G06Q 30/0241* (2013.01); *G06T 15/205* (2013.01); *H04N 23/698* (2023.01)

(58) Field of Classification Search
None
See application file for complete search history.

(56) References Cited

U.S. PATENT DOCUMENTS 8,736,636 B2 * 5/2014 Kang ...................... G06F 16/29
455/448
10,127,632 B1 11/2018 Burke et al.
(Continued)

FOREIGN PATENT DOCUMENTS

CN 104038694 A 9/2014
CN 105491353 A 4/2016
(Continued)

OTHER PUBLICATIONS

Tencent Technology, Extended European Search Report, EP Patent Application No. 22848178.4, Aug. 12, 2024, 11 pgs.
(Continued)

*Primary Examiner* — Joni Hsu
(74) *Attorney, Agent, or Firm* — Morgan, Lewis & Bockius LLP

(57) ABSTRACT

This application relates to a method for pushing recommendation information when displaying a panoramic image, performed by a mobile terminal. The method includes: displaying a first partial image of a target panoramic image projected into a view finding region of the mobile terminal; in response to a first spatial movement of the mobile terminal, displaying a second partial image of the target panoramic image projected into the view finding region of the mobile terminal based on a proportional displacement from the first partial image to the second partial image within the target panoramic image; and causing a display of recommendation information configured for the second partial image when the second partial image is located in a target image interval of the target panoramic image.

19 Claims, 13 Drawing Sheets

(51) Int. Cl.
    *G06T 3/16*     (2024.01)
    *G06T 15/20*    (2011.01)

(56)         References Cited

U.S. PATENT DOCUMENTS

| | | | |
|---|---|---|---|
| 10,261,749 B1* | 4/2019 | Wilcox | G06F 3/04845 |
| 2009/0310845 A1 | 12/2009 | Ogawa et al. | |
| 2010/0066860 A1* | 3/2010 | Tsurumi | H04N 5/772 |
| | | | 348/231.2 |
| 2011/0319130 A1* | 12/2011 | Lee | G06T 19/20 |
| | | | 345/589 |
| 2012/0233003 A1* | 9/2012 | Calman | G06Q 30/06 |
| | | | 705/16 |
| 2014/0025481 A1* | 1/2014 | Kang | G06Q 30/0241 |
| | | | 705/14.43 |
| 2014/0316905 A1* | 10/2014 | Song | G06Q 30/02 |
| | | | 705/14.72 |
| 2017/0078654 A1* | 3/2017 | Facin | G06F 3/011 |
| 2017/0347022 A1* | 11/2017 | Pettersson | H04N 23/698 |
| 2021/0125227 A1* | 4/2021 | Lee | G06Q 30/0266 |

FOREIGN PATENT DOCUMENTS

| | | |
|---|---|---|
| CN | 107633241 A | 1/2018 |
| CN | 107682638 A | 2/2018 |
| CN | 109960546 A | 7/2019 |
| JP | 2013251787 A | 12/2013 |
| JP | 2019164548 A | 9/2019 |
| JP | 2020042674 A | 3/2020 |
| JP | 2020173763 A | 10/2020 |

OTHER PUBLICATIONS

Tencent Technology, WO, PCT/CN2022/102107, Sep. 27, 2022, 3 pgs.
Tencent Technology, IPRP, PCT/CN2022/102107, Jan. 18, 2024, 4 pgs.
Tencent Technology, Japanese office Action, JP Patent Application No. 2023-548851, Jul. 12, 2024, 18 pgs.
Tencent Technology, ISR, PCT/CN2022/102107, Sep. 27, 2022, 2 pgs.

* cited by examiner

INFORMATION PUSHING METHOD AND APPARATUS BASED ON PANORAMIC IMAGE, AND MOBILE TERMINAL

CROSS-REFERENCE TO RELATED APPLICATIONS

This application is a continuation application of PCT Patent Application No. PCT/CN2022/102107, entitled "INFORMATION PUSHING METHOD AND APPARATUS BASED ON PANORAMIC IMAGE, AND MOBILE TERMINAL" filed on Jun. 29, 2022, which claims priority to Chinese Patent Application No. 2021108468594, entitled "INFORMATION PUSHING METHOD AND APPARATUS BASED ON PANORAMIC IMAGE, AND MOBILE TERMINAL" filed with the State Intellectual Property Office of P. R. China on Jul. 26, 2021, all of which is incorporated herein by reference in its entirety.

FIELD OF THE TECHNOLOGY

This application relates to the field of computer technologies, in particular to an information pushing method and apparatus based on a panoramic image, a mobile terminal, a computer-readable storage medium, and a computer program product.

BACKGROUND OF THE DISCLOSURE

With the development of the computer technology, the way of information display is becoming more and more diversified. For example, information is displayed through a panoramic image. The panoramic image is a composite image obtained by seamlessly stitching a group of images around a point as a center. A mobile terminal may sense a movement orientation of a user according to a built-in gyroscope, compute a position corresponding to the panoramic image, and project the position on a display interface of the mobile terminal. Different partial images in the panoramic image are displayed in different orientations, so that the user can see the image in a 3-dimension (3D) effect.

When the panoramic image is used for information pushing, generally, recommendation information is directly added to the panoramic image, and the recommendation information is displayed as a part of the panoramic image, so that the user can obtain the recommendation information from a projection picture of the panoramic image.

However, the user tends to focus on the projection picture of the panoramic image, thus ignoring the recommendation information in the panoramic image and affecting the information pushing effect.

SUMMARY

Based on this, aiming at the above technical problems, it is necessary to provide an information pushing method and apparatus based on a panoramic image, a mobile terminal, a computer-readable storage medium, and a computer program product, which can improve the information pushing effect.

Provided is a method for pushing recommendation information when displaying a panoramic image, performed by a mobile terminal. The method includes:

displaying a first partial image of a target panoramic image projected into a view finding region of the mobile terminal;

in response to a first spatial movement of the mobile terminal, displaying a second partial image of the target panoramic image projected into the view finding region of the mobile terminal based on a proportional displacement from the first partial image to the second partial image within the target panoramic image; and causing a display of recommendation information configured for the second partial image when the second partial image is located in a target image interval of the target panoramic image.

Provided is an information pushing apparatus based on a panoramic image. The apparatus includes:

a first projection module, configured to display a first partial image of a target panoramic image projected into a view finding region of a mobile terminal;

a second projection module, configured to, in response to a first spatial movement of the mobile terminal, display a second partial image of the target panoramic image projected into the view finding region of the mobile terminal based on a proportional displacement from the first partial image to the second partial image within the target panoramic image; and an information pushing module, configured to cause a display of recommendation information configured for the second partial image when the second partial image is located in a target image interval of the target panoramic image.

Provided is a mobile terminal, including a memory and a processor. The memory stores computer-readable instructions. The computer-readable instructions, when executed by the processor, cause the mobile terminal to implement the following steps:

displaying a first partial image of a target panoramic image projected into a view finding region of the mobile terminal;

in response to a first spatial movement of the mobile terminal, displaying a second partial image of the target panoramic image projected into the view finding region of the mobile terminal based on a proportional displacement from the first partial image to the second partial image within the target panoramic image; and causing a display of recommendation information configured for the second partial image when the second partial image is located in a target image interval of the target panoramic image.

Provided is a non-transitory computer-readable storage medium, storing computer-readable instructions. The computer-readable instructions, when executed by a processor of a mobile terminal, cause the mobile terminal to implement the following steps:

displaying a first partial image of a target panoramic image projected into a view finding region of the mobile terminal;

in response to a first spatial movement of the mobile terminal, displaying a second partial image of the target panoramic image projected into the view finding region of the mobile terminal based on a proportional displacement from the first partial image to the second partial image within the target panoramic image; and causing a display of recommendation information configured for the second partial image when the second partial image is located in a target image interval of the target panoramic image.

Provided is a computer program product, including a computer program, where the computer program, when executed by a processor of a mobile terminal, causes the mobile terminal to implement the following steps:

displaying a first partial image of a target panoramic image projected into a view finding region of the mobile terminal;

in response to a first spatial movement of the mobile terminal, displaying a second partial image of the target panoramic image projected into the view finding region of the mobile terminal based on a proportional displacement from the first partial image to the second partial image within the target panoramic image; and causing a display of recommendation information configured for the second partial image when the second partial image is located in a target image interval of the target panoramic image.

The details of one or more embodiments of this application are set out in the following drawings and descriptions. Other features, objectives and advantages of this application will become apparent from the specification, drawings and claims.

BRIEF DESCRIPTION OF THE DRAWINGS

To describe the technical solutions in the embodiments of this application or in the related art more clearly, the following briefly introduces the drawings required for describing the embodiments or the related art. It is apparent that the drawings in the following description are only some embodiments of this application. Those skilled in the art can also obtain other drawings according to these drawings without any creative work.

DESCRIPTION OF EMBODIMENTS

In order to make the objectives, technical solutions and advantages of this application clearer, this application will be further described in detail below with reference to the drawings and embodiments. It is to be understood that the specific embodiments described herein are merely used for illustrating this application, but are not intended to limit this application.

Figure 1:
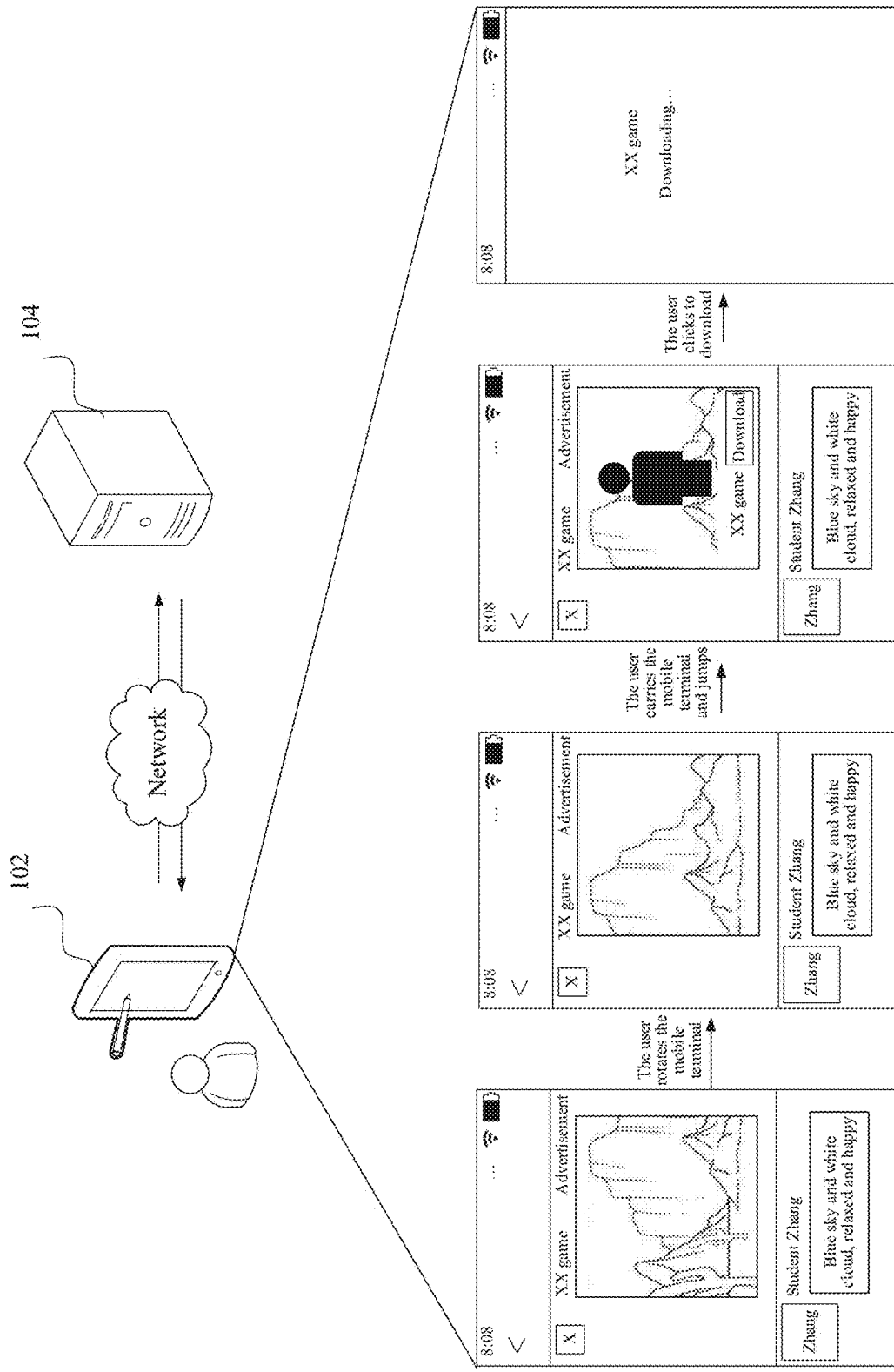
FIG. 1 is an application environment diagram of an information pushing method based on a panoramic image in an embodiment.

An information pushing method based on a panoramic image, provided by this application, can be applied to an application environment shown in FIG. 1. A mobile terminal 102 communicates with a server 104 through the network. A user triggers the projection display of a panoramic image through the mobile terminal 102, the mobile terminal 102 displays a first partial image of a target panoramic image projected into the view finding region in a view finding region of the mobile terminal 102 in response to a trigger operation for the projection display of the panoramic image; the mobile terminal 102 displays a second partial image in the displaced view finding region in response to the displacement of the view finding region relative to the target panoramic image, where the second partial image is another partial image of the target panoramic image projected into the displaced view finding region; and when the second partial image is located in a target image interval of the target panoramic image, recommendation information configured for the target image interval is pushed to display the recommendation information on the second partial image. The recommendation information may be provided by the server 104. The recommendation information may be automatically displayed based on the generated displacement, or may be displayed in response to an information pushing trigger operation triggered by the user. In some embodiments, the recommendation information is chosen based on the content of the second partial image. For example, if the second partial image shows a race car, the recommendation information may be a car racing game application. If the second partial image shows a waterfront, the recommendation information may be a water game application. In some embodiments, the target panoramic image is captured by the mobile terminal in real time using its camera. In some other embodiments, the target panoramic image is captured by another mobile terminal and then shared with other mobile terminals (including the mobile terminal 102) via a remote server.

The mobile terminal 102 may be, but is not limited to, various notebook computers, smart phones, tablet personal computers, vehicle-mounted terminals and portable wearable devices, and the portable wearable devices may be smart watches, smart bracelets, headset devices, and the like. The server 104 may be implemented by an independent server or a server cluster composed of multiple servers.

Figure 2:
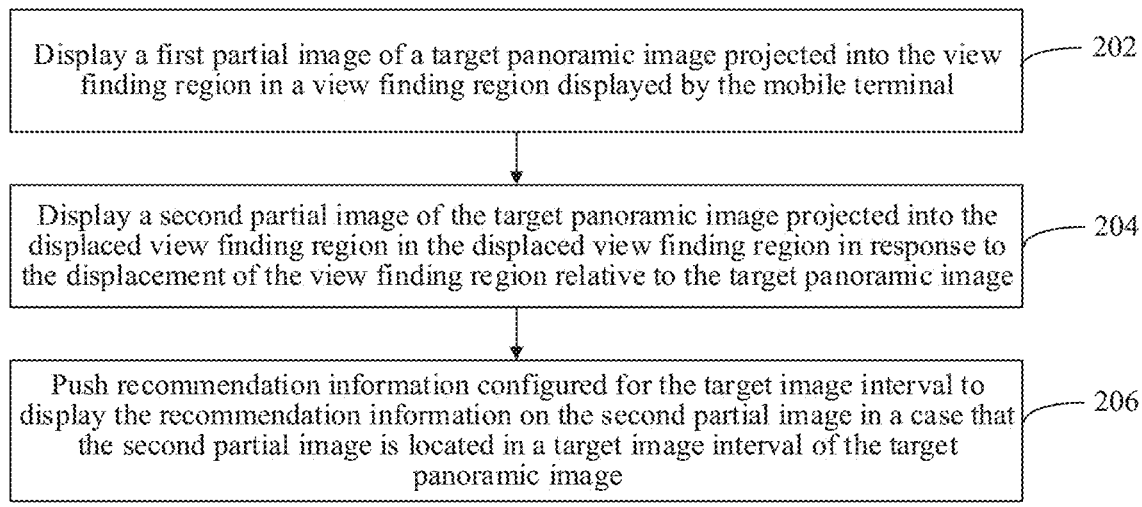
FIG. 2 is a schematic flowchart of an information pushing method based on a panoramic image in an embodiment.

In an embodiment, as shown in FIG. 2, an information pushing method based on a panoramic image is provided. The method applied to a mobile terminal in FIG. 1 is taken as an example for description.

Step 202: Display a first partial image of a target panoramic image projected into the view finding region in a view finding region displayed by the mobile terminal.

Figure 3:
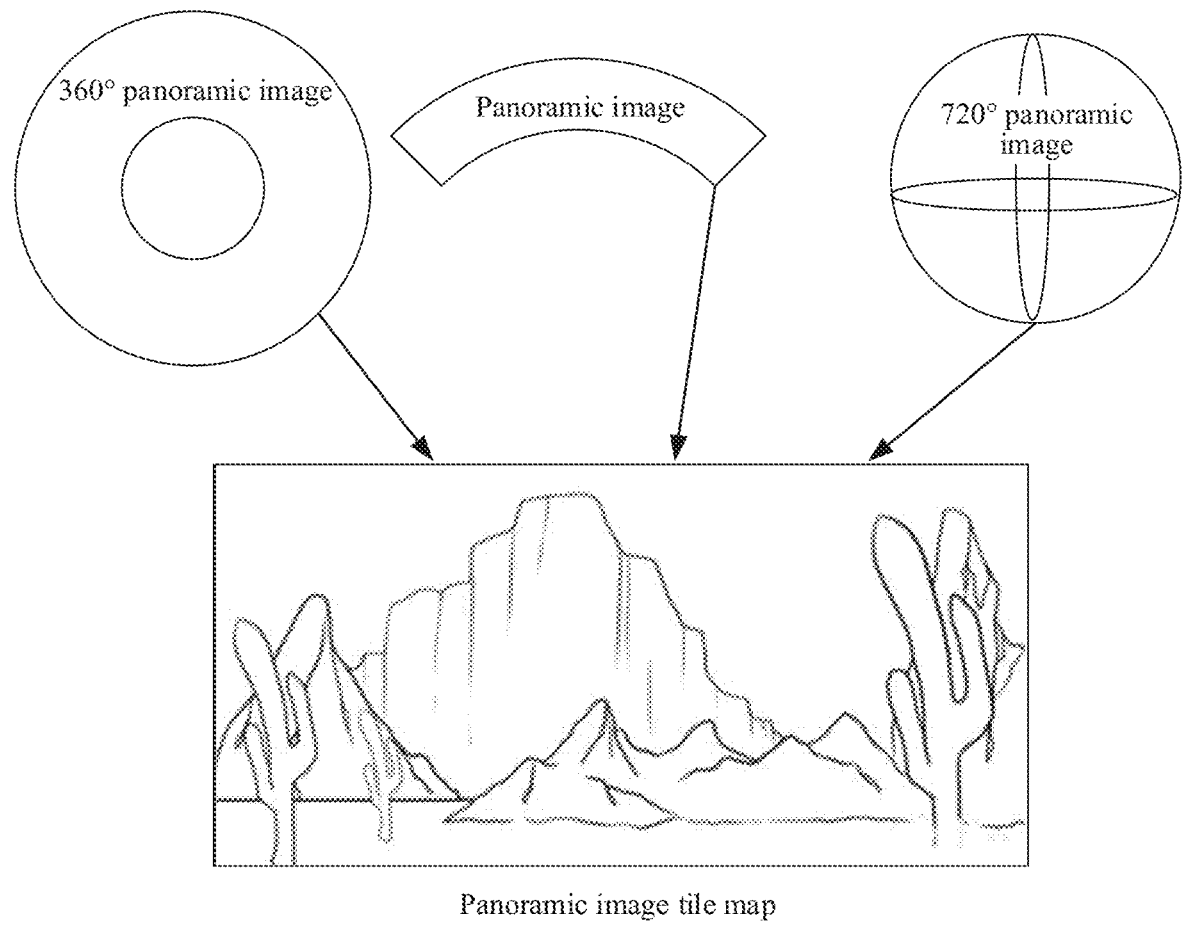
FIG. 3 is a schematic diagram of different types of panoramic images in an embodiment.
Figure 4:
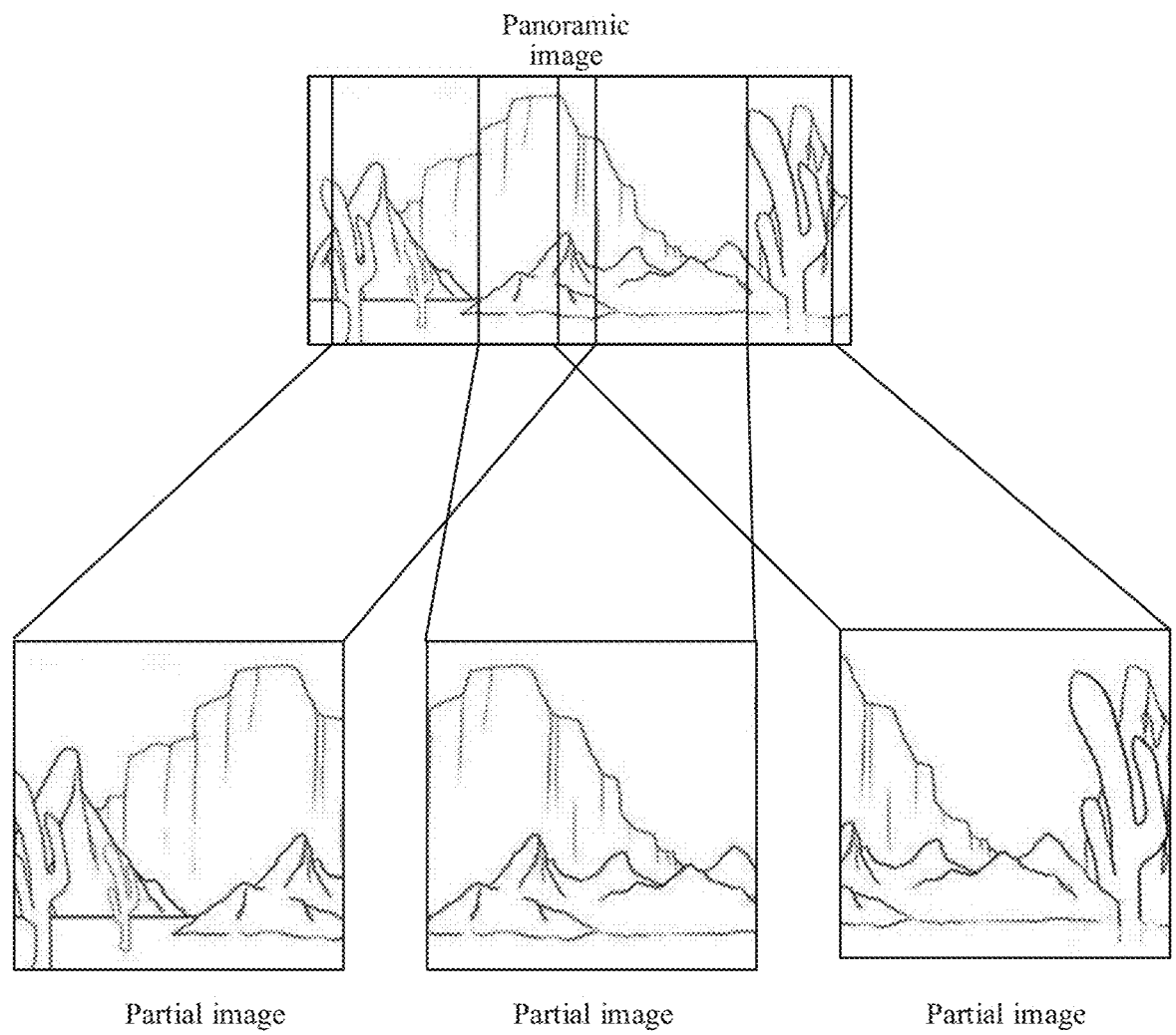
FIG. 4 is a schematic interface diagram of displaying partial images in view finding regions after different displacements in an embodiment.

The panoramic image is a composite image obtained by seamlessly stitching a group of images around a point as a center. As shown in FIG. 3, the panoramic image may be a 360° circular image, a semi-circular image less than 360°, or a 720° spherical image. The mobile terminal refers to a terminal that may be used normally in a moving process. The mobile terminal may have a displacement relative to the panoramic image, thus changing the partial image projected by the panoramic image. As shown in FIG. 4, a view finding region is a region for displaying a partial image projected by a panoramic image on a screen of a mobile terminal. The size of the view finding region may be the same as the size of the screen of the mobile terminal. For example, the projected partial image is displayed on the full screen of the mobile terminal. The size of the view finding region may also be less than the size of the screen of the mobile terminal, so that other information may also be displayed on the screen of the mobile terminal in addition to the projected partial image. The target panoramic image is a panoramic image displayed by projecting the partial image into the view finding region of the mobile terminal. The first partial image is a partial image determined from the target panoramic image and projected into the view finding region to be displayed.

Specifically, when a user triggers the projection display of a panoramic image on the mobile terminal, the mobile terminal displays a view finding region on the screen, a first partial image of a target panoramic image projected into the view finding region is displayed in the view finding region, and the user may view the partial image of any orientation in the target panoramic image by changing the view finding orientation of the mobile terminal or adjusting a projection center point of the target panoramic image. In a specific application, the user triggers a projection display operation of a panoramic image, the mobile terminal displays a view finding region on the screen in response to the projection display operation, a first partial image of a target panoramic image projected into the view finding region is displayed in the view finding region, and the coordinate position of the center point of the first partial image in the target panoramic image is a preset position. For example, the coordinates of the center point of the first partial image in the coordinate system corresponding to the target panoramic image are (R, 0, 0), where R represents a distance between a reference center point used during the construction of a target panoramic image and any position in the target panoramic image.

Step 204: Display a second partial image of the target panoramic image projected into the displaced view finding region in the displaced view finding region in response to the displacement of the view finding region relative to the target panoramic image.

Figure 5:
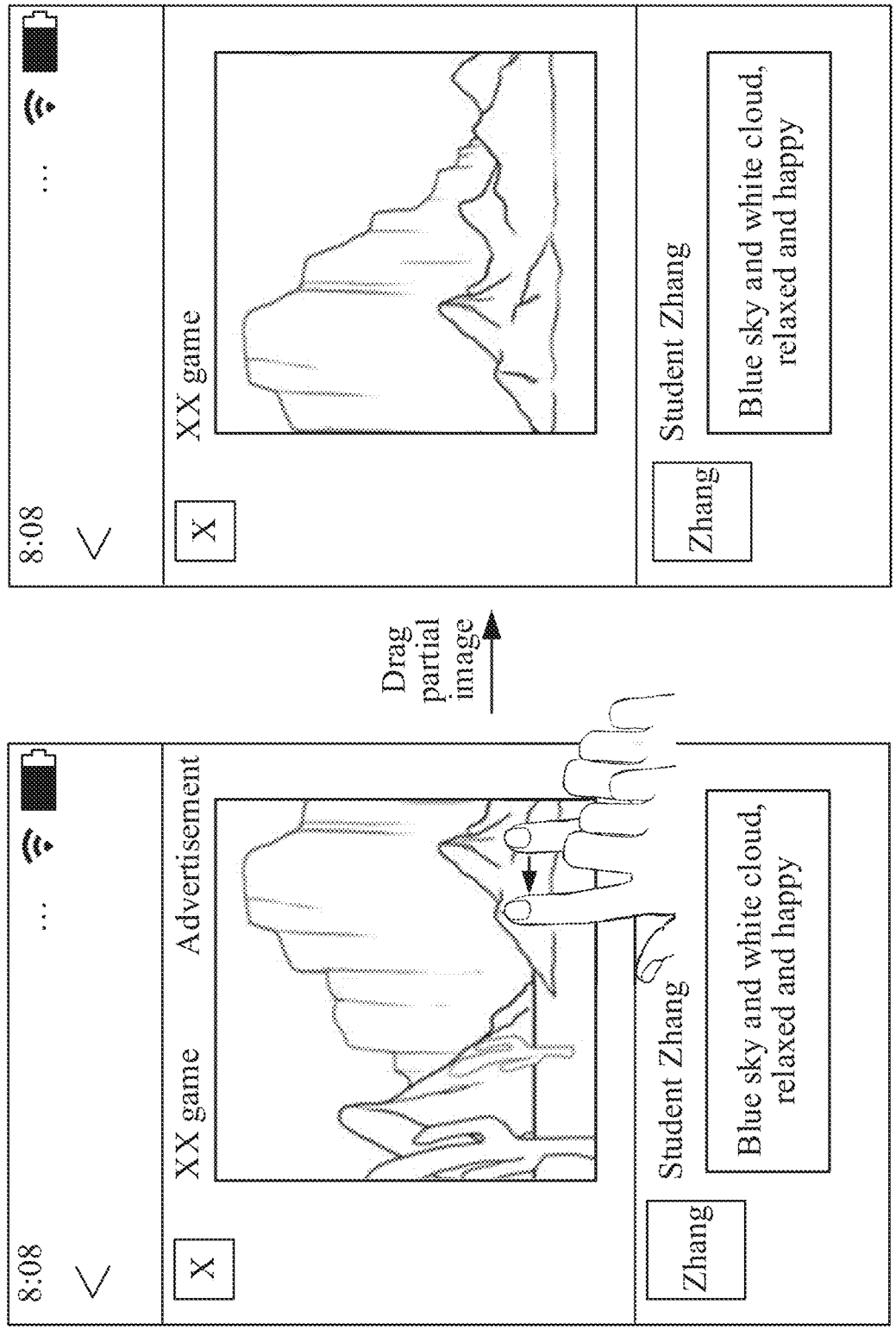
FIG. 5 is a schematic interface diagram of displaying a partial image in a view finding region in an embodiment.
Figure 6:
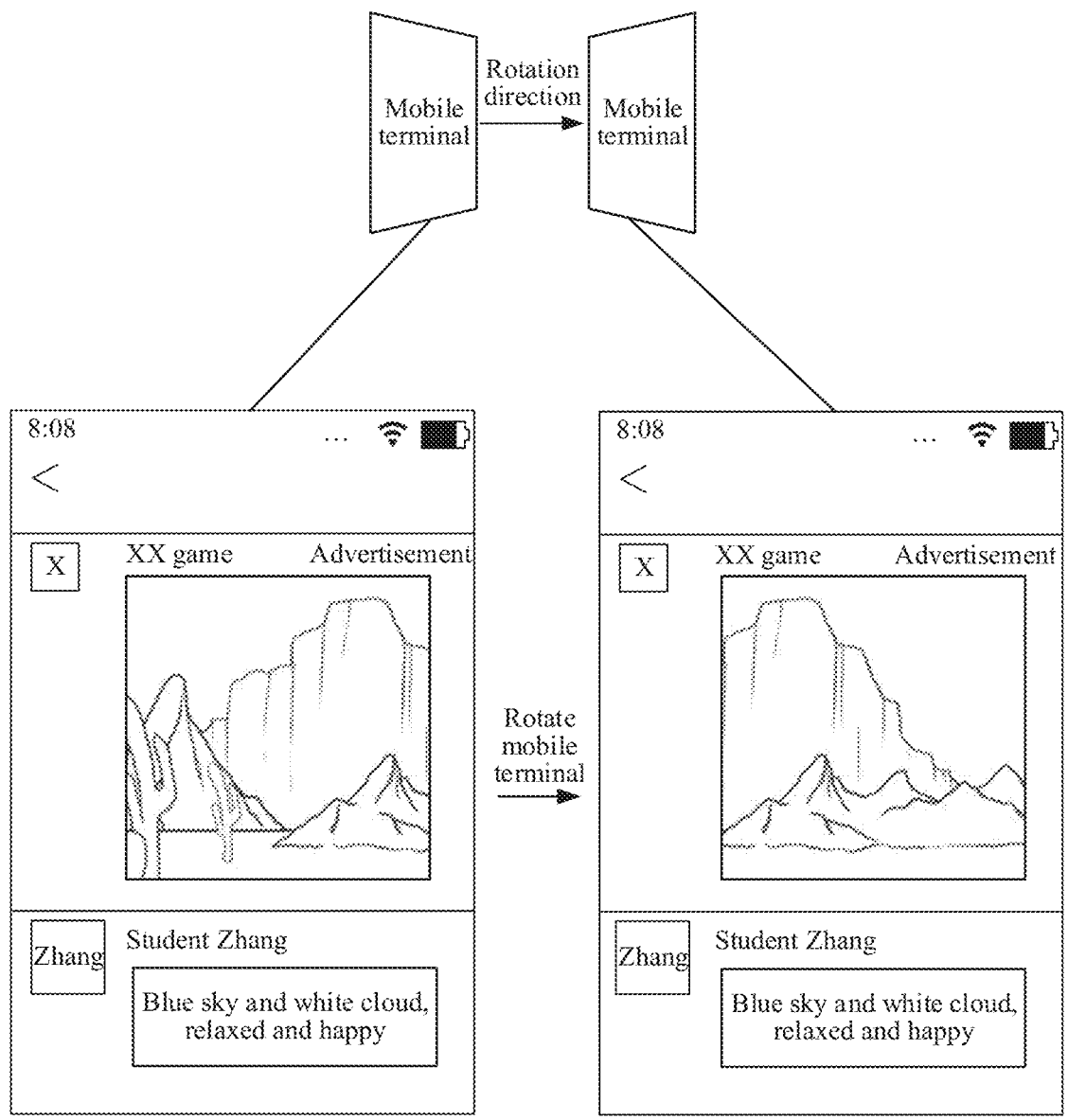
FIG. 6 is a schematic interface diagram of displaying a partial image in a view finding region in another embodiment.

The displacement of the view finding region relative to the target panoramic image is a relative displacement between the view finding region and the target panoramic image. The displacement specifically may be a relative displacement generated by changing the view finding orientation of the mobile terminal by the user, or a relative displacement generated by adjusting the projection orientation of the target panoramic image by the user. As shown in FIG. 5, the adjustment of the projection orientation of the target panoramic image may be implemented by sliding the partial image in the view finding region in any direction by the user to change the projection orientation. As shown in FIG. 6, the change of the view finding orientation of the mobile terminal may be implemented by controlling the mobile terminal to rotate around a target point by the user, where the target point is a point in the direction facing the screen of the mobile terminal. Since the displacement is relative, the perspective variation of the view finding orientation of the mobile terminal may represent the magnitude of the displacement of the view finding region relative to the target panoramic image, where the greater the perspective variation, the greater the relative displacement of the view finding region, and the smaller the perspective variation, the smaller the relative displacement of the view finding region. The adjustment amplitude of the projection orientation of the target panoramic image may also represent the displacement of the view finding region relative to the target panoramic image, where the greater the adjustment amplitude, the greater the relative displacement of the view finding region, and the smaller the adjustment amplitude, the smaller the relative displacement of the view finding region.

The second partial image and the first partial image are both partial images in the target panoramic image. Due to the displacement of the view finding region relative to the target panoramic image, the partial image of the target panoramic image projected into the view finding region will change. Since the size of the view finding region is not changed, the first partial image and the second partial image have a same size. The position of the center point of the second partial image in the target panoramic image is related to the position of the center point of the first partial region in the target panoramic image and the displacement of the view finding region relative to the target panoramic image. Specifically, the mobile terminal determines the position of the center point of the second partial region in the target panoramic image based on the position of the center point of the first partial region in the target panoramic image and the displacement of the view finding region relative to the target panoramic image, and then, determines a second partial image to be projected based on the size of the view finding region, so as to display a second partial image of the target panoramic image projected into the displaced view finding region.

Specifically, when the mobile terminal detects that the user changes the view finding orientation of the mobile terminal or the user adjusts the projection orientation of the target panoramic image, the mobile terminal has a displacement relative to the target panoramic image based on the view finding region, and a second partial image of the target panoramic image projected into the displaced view finding region is displayed in the displaced view finding region, so that the projected partial image of the target panoramic image changes with the relative displacement, which realizes the multi-angle display of the target panoramic image.

Step 206: Push recommendation information configured for the target image interval to display the recommendation information on the second partial image when the second partial image is located in a target image interval of the target panoramic image.

The target image interval is configured with corresponding recommendation information, and the target image interval is a part of the target panoramic image. The image size corresponding to the target image interval is less than the image size of the target panoramic image and greater than the image size of the partial image projected into the view finding region. One or more image intervals of the target panoramic image may be provided. For example, the target image interval specifically may be one of the multiple image intervals obtained after the interval partition of the target panoramic image. After different displacements, the image intervals of the projected second partial images may be the same or different. For example, for a 360° circular panoramic image, 6 image intervals are obtained by partitioning the target panoramic image at 60° equidistant intervals. When the relative angle of the center point of the second partial image in a 360° circular panoramic image coordinate system is 30°, the image interval to which the second partial image belongs is a first image interval. When the relative angle of the center point of the second partial image in the 360° circular panoramic image coordinate system is 45°, the image interval to which the second partial image belongs is a first image interval. When the relative angle of the center point of the second partial image in the 360° circular panoramic image coordinate system is 75°, the image interval to which the second partial image belongs is a second image interval.

The recommendation information is the information recommended to users. The recommendation information may be displayed through one or more interface elements. The recommendation information may specifically include, but is not limited to, various forms of interface elements such as windows, dialog boxes, graphics, texts, music and videos. Text or picture type recommendation information may be displayed through image interface elements. The image interface element may be a static image or a dynamic image composed of multiple static images. The displayed recommendation information may be a type of interface element or a combination of different types of interface elements. The recommendation information is the information configured for image intervals. Different image intervals may correspond to the same type of recommendation information with different contents, and may also correspond to different types of recommendation information. Specifically, the recommendation information may be set according to user needs. A piece of recommendation information or multiple pieces of recommendation information may be configured for the same image interval, where multiple pieces of recommendation information may be displayed at the same time, or may be switched to be displayed in response to an information updating operation.

Figure 7:
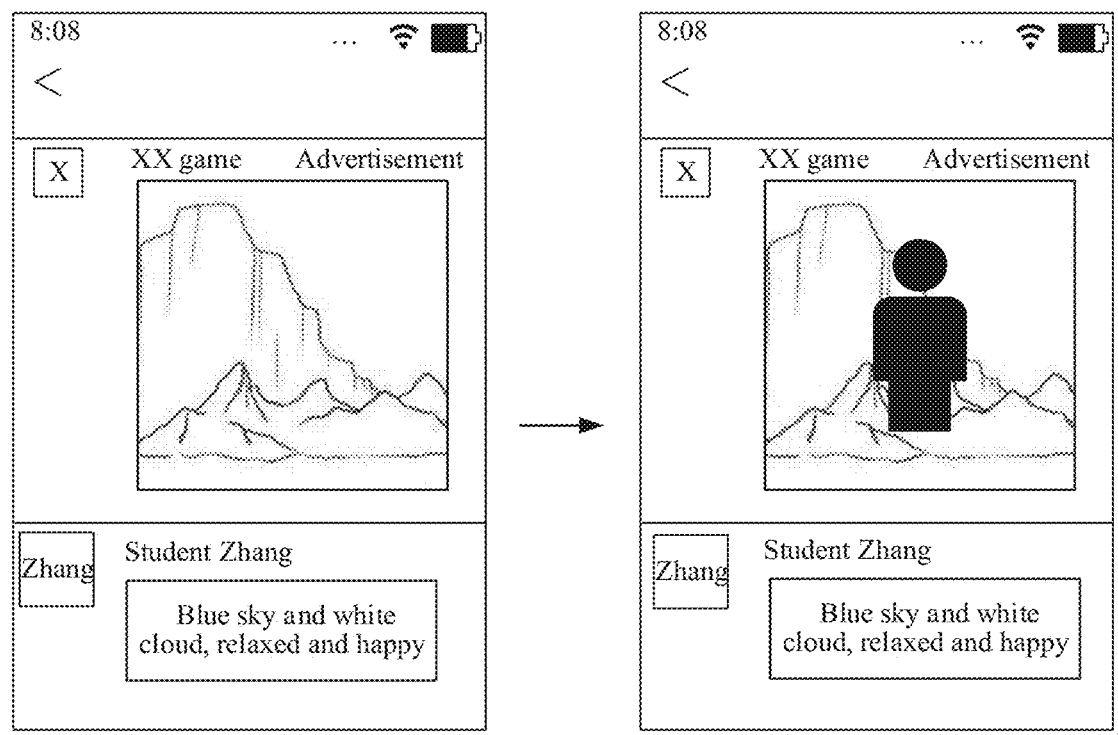
FIG. 7 is a schematic interface diagram of displaying recommendation information in an embodiment.

Specifically, as shown in FIG. 7, when detecting that the second partial image belongs to a target image interval of the target panoramic image, the mobile terminal performs the superimposed display of the recommendation information matched with the target image interval on the second partial image, and the user may obtain the recommendation information from the displayed second partial image. By performing the superimposed display of the recommendation information on the second partial image, the user may focus on the recommendation information displayed in a superimposed mode, thus improving the information pushing effect.

According to the information pushing method based on a panoramic image, by displaying the first partial image of the target panoramic image projected into the view finding region in the view finding region displayed by the mobile terminal, projection of the partial image is realized, and the mobile terminal displays the second partial image of the target panoramic image projected into the displaced view finding region in the displaced view finding region in response to the displacement of the view finding region relative to the target panoramic image, so that different partial images are displayed respectively in the same view finding region through the generated relative position; and when the second partial image is located in the target image interval of the target panoramic image, recommendation information configured for the target image interval is pushed to display the recommendation information on the second partial image. In an information pushing process, compared with the processing mode of directly adding the recommendation information to a fixed position in the panoramic image, when the second partial image belongs to a target image interval of the target panoramic image, the recommendation information configured for the target image interval is displayed. By decoupling the panoramic image from the recommendation information and displaying the recommendation information on the projected partial image, the display probability of the recommendation information is increased, thereby improving the information pushing effect.

In an embodiment, when the view finding region is a promotion information display page, the information pushing method based on a panoramic image further includes: a promotion information display page corresponding to the target application is displayed in response to a starting operation for the target application.

The promotion information display page refers to a page used for information display and promotion when an application is started, such as a screen opening advertising page of an application. The target application refers to an application with a function of displaying the promotion information display page. The contents displayed in the promotion information display page may be contents displayed by authorization of the target application, which specifically may be contents related to the target application, or contents unrelated to the target application, such as information corresponding to other platforms having a cooperative relationship with the target application.

Specifically, when detecting that the user triggers and starts the application, the mobile terminal displays the promotion information display page first before entering a running page of the application. In a specific application, the promotion information display page may be displayed within a preset time after the application is started. After the preset time, when it is not detected that the user triggers the content displayed in the promotion information display page, the mobile terminal enters the running page of the application.

Further, a first partial image of the target panoramic image projected into the view finding region is displayed in the view finding region displayed by the mobile terminal, including: a first partial image of the target panoramic image projected into the view finding region is displayed in the promotion information display page.

Figure 8:
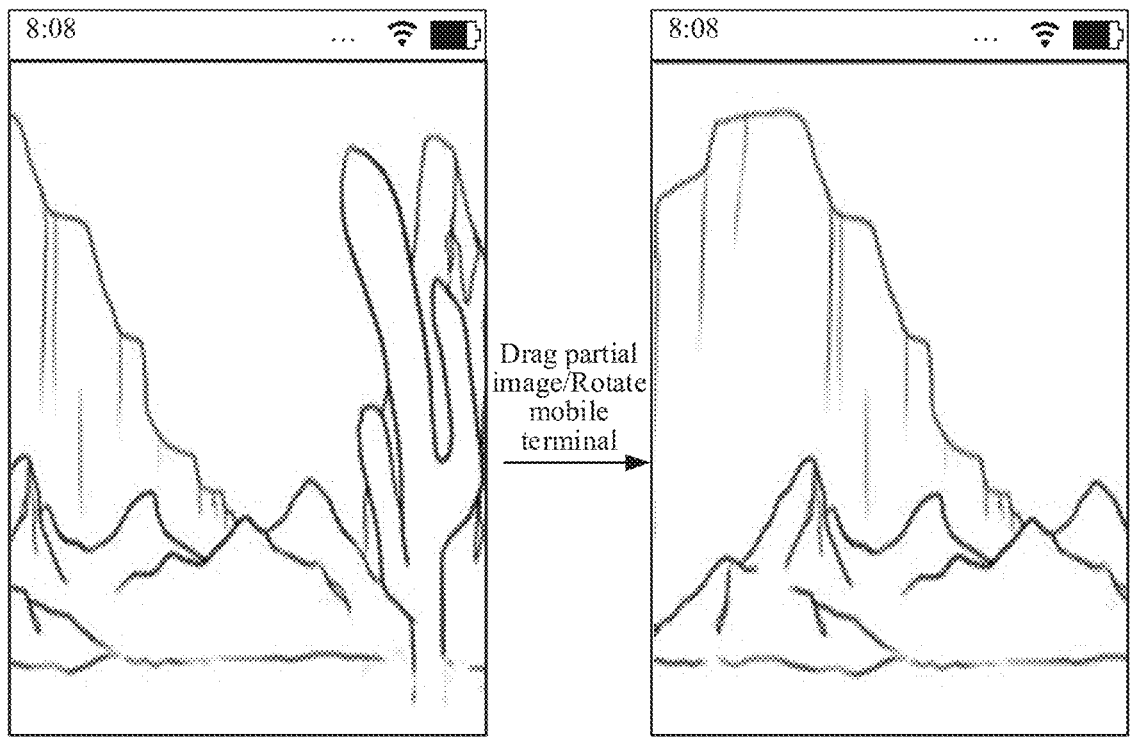
FIG. 8 is a schematic interface diagram of a view finding region in an embodiment.

In a specific application, as shown in FIG. 8, when the target application is triggered and started, the mobile terminal displays the promotion information display page on the full screen, a first partial image of the target panoramic image projected into the view finding region is displayed in the promotion information display page, and the mobile terminal may realize the updated display of the partial image in response to the displacement of the view finding region relative to the target panoramic image.

In this embodiment, by triggering and starting the application by the user, the promotion information display page is displayed first before entering the running page of the application; and by displaying the first partial image of the target panoramic image projected into the view finding region in the promotion information display page, the promotion information display page may be effectively displayed, and at the same time, the use of the application used by the user is not affected. On the one hand, the full-screen display mode may simplify the data processing of page parameters and increase the data processing capacity required for page layout. On the other hand, the full-screen display may display more contents, attract the attention of the user to a great extent, and facilitate the subsequent effective recommendation of information.

In an embodiment, when the view finding region is a promotion information display region, the information pushing method based on a panoramic image further includes: a promotion information display region is displayed in an information flow display page of the target application.

The target application refers to an application with a function of displaying an information flow. The promotion information display region refers to an information flow display region in the information flow display page of the application. The information flow display page may be a dynamic display page of a social application, and the like. The promotion information display region may be a recommended advertising space in the dynamic display page. The contents displayed in the promotion information display region may be contents displayed by authorization of the target application, which specifically may be contents related to the target application, or contents unrelated to the target application, such as information corresponding to other platforms having a cooperative relationship with the target application. Specifically, in response to an operation for entering the information flow display page of the target application triggered by the user, the mobile terminal displays the information flow display page, and displays the promotion information display region at a specified information flow display position in the information flow display page.

Further, a first partial image of the target panoramic image projected into the view finding region is displayed in the view finding region displayed by the mobile terminal, including: a first partial image of the target panoramic image projected into the view finding region is displayed in the promotion information display region.

In a specific application, as shown in FIG. 3 to FIG. 6, the view finding region may be one of the promotion information display regions in the information flow display page of the application, such as an image display region in the recommended advertising space in the dynamic display page of the social application. When the user views the information in the dynamic display page of the social application by sliding and slides the content corresponding to the recommended advertising space to the current page, a first partial image of the target panoramic image projected into the view finding region is displayed in the image display region in the recommended advertising space.

In this embodiment, the promotion information display region is displayed in the information flow display page of the target application, and the first partial image of the target panoramic image projected into the view finding region is displayed in the promotion information display region. On the one hand, by means of the characteristic of independent display of information in the information flow display page, the complexity of configuring interface configuration parameters for displaying the projected partial image is reduced, and the required data processing capacity is reduced, thereby increasing the data processing efficiency. On the other hand, by means of the characteristic of using the information flow display page as an object that the user often browses, the promotion information display region is displayed in the information flow display page, thereby increasing the exposure of the view finding region. The display mode of displaying the projected partial image is combined to attract the attention of the user to a great extent, and facilitate the subsequent effective recommendation of information.

In an embodiment, a second partial image of the target panoramic image projected into the displaced view finding region is displayed in the displaced view finding region in response to the displacement of the view finding region relative to the target panoramic image, including:

a second partial image of the target panoramic image projected into the view finding region after the adjustment of the view finding orientation is displayed in the view finding region after the adjustment of the view finding orientation in response to the adjustment of a view finding orientation for the view finding region.

The view finding orientation refers to an orientation facing the mobile terminal where the view finding region is located. Specifically, when the user changes the orientation of the mobile terminal by holding the mobile terminal and rotating the arm or body, the mobile terminal may detect the orientation change based on a built-in gyroscope sensor and may detect a specific orientation change parameter, so that the mobile terminal may determine the view finding orientation corresponding to the view finding region after the adjustment of the view finding orientation based on the orientation change parameter provided by the gyroscope sensor (such as the magnitude of the relative displacement between the view finding region and the target panoramic image). The relative displacement between the view finding region and the target panoramic image, generated by the adjustment of the view finding orientation, may be the orientation change of the view finding region substantially.

Specifically, when the gyroscope sensor of the mobile terminal detects that the orientation of the mobile terminal changes, that is, the view finding orientation of the view finding region is adjusted, a second partial image of the target panoramic image projected into the view finding region is displayed in the view finding region of the mobile terminal with orientation change. FIG. 6 shows the respective state of the mobile terminal in different view finding orientations.

In this embodiment, on the one hand, by means of the adjustment of the view finding orientation for the view finding region, that is, the orientation change of the mobile terminal, the specific orientation change data may be accurately detected by the mobile terminal based on the built-in gyroscope sensor, and the like. By implementing the detection process of the orientation change with devices such as the gyroscope sensor, the data processing and analysis capacity of the mobile terminal may be reduced, and the data processing pressure may be reduced. On the other hand, the user may participate in the interactive process of displaying the projected partial image by changing the orientation of the mobile terminal, and then, the projected partial image moves with the movement of the orientation of the user, thereby enriching the interactive form in the display process of the partial image and improving the interest in the display process of the partial image.

In another embodiment, a second partial image of the target panoramic image projected into the displaced view finding region is displayed in the displaced view finding region in response to the displacement of the view finding region relative to the target panoramic image, including; a second partial image of the target panoramic image projected into the view finding region after the adjustment of a projection orientation is displayed in the view finding region in response to a projection orientation adjustment operation for the target panoramic image.

The projection orientation is an orientation of a projected reference point of the target panoramic image in the target panoramic image. The reference point may be any point selected from the target panoramic image. For example, if a point at the 0° position in the 360° panoramic image is selected as a reference point, when the target panoramic image is rotated 45° clockwise, the position of the reference point in the 360° panoramic image is the 45° direction. Therefore, the projection orientation is adjusted by 45° clockwise rotation. For the projection orientation adjustment operation for the target panoramic image, a drag operation may be performed on the displayed partial image on the mobile terminal to adjust the projection orientation of the target panoramic image.

In this embodiment, the projection orientation of the target panoramic image is adjusted to enable the view finding region to have a displacement relative to the target panoramic image, the specific orientation change data is determined in response to the projection orientation adjustment operation, and the whole process may be implemented through a data processor, thereby reducing the dependence on the hardware for detecting the orientation change in the mobile terminal, and expanding use scenes. Furthermore, the user may change the projected partial image without changing the physical orientation of the mobile terminal, thereby providing a variety of interactive modes for the user, and improving the information pushing effect.

In an embodiment, the recommendation information includes a 3D image. The recommendation information configured for the target image interval is pushed to display the recommendation information on the second partial image, including: a first perspective image of the 3D image projected into the view finding region is displayed on the second partial image.

The 3D image refers to a three-dimensional image with length, width and depth data. Different effects of the 3D image may be displayed through different perspectives. For example, the 3D image may be a simple cube, a simple cuboid, a complex three-dimensional game character, or the like. The first perspective image is an image corresponding to any perspective of the 3D image, such as a front perspective, a back perspective or a side perspective. Specifically, for different target image intervals, different 3D images may be displayed. When the second partial image belongs to a target image interval of the target panoramic image, based on the 3D image matched with the target image interval, a first perspective image of the 3D image projected into the view finding region is displayed on the second partial image, w % here the first perspective image may be displayed on the second partial image in a superimposed mode.

Further, the information pushing method based on a panoramic image further includes: a second perspective image of the 3D image projected into the view finding region after the perspective offset is displayed on the second partial image in response to the perspective offset of the 3D image relative to the view finding region.

The first perspective image and the second perspective image are images corresponding to different display perspectives of the 3D image. The perspective offset is the perspective change of the 3D image relative to the view finding region. Specifically, the perspective offset may be implemented by an operation of dragging the 3D image in a certain direction by the user. Further, when a 3D image is displayed on the second partial image, the function of adjusting the projection perspective of the displayed partial image may be disabled to ensure that the object affected by the drag operation in a certain direction is unique.

In this embodiment, the 3D image is displayed as the recommendation information. On the one hand, more diversified recommendation information may be displayed to realize the diversified display of the recommendation information, and the attention of the user may be attracted through the 3D image. On the other hand, the 3D image is displayed in the panoramic image, and the perspective of the 3D image may be changed based on the user operation to increase the interactive intensity with the user, thereby being favorable for improving the information pushing effect.

In an embodiment, the recommendation information configured for the target image interval is pushed to display the recommendation information on the second partial image, including: a recommendation information display region is displayed on the second partial image in a superimposed mode; and recommendation information in an image format and a recommendation detail entry are displayed in the recommendation information display region. The information pushing method based on a panoramic image further includes; recommendation detail contents of the recommendation information are pushed in response to a detail display trigger operation triggered for the recommendation detail entry during the display of the recommendation detail entry.

Figure 11:
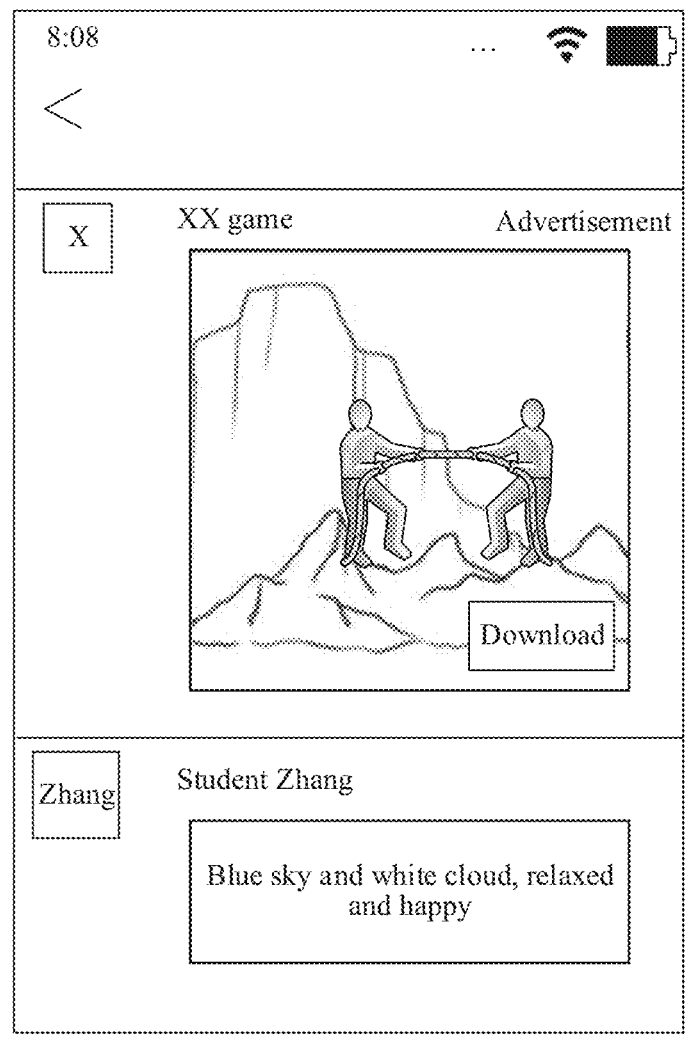
FIG. 11 is a schematic interface diagram of displaying recommendation information and a detail content entry in an embodiment.

The recommendation detail contents are more detailed data information associated with the recommendation information. For example, when the recommendation information is an advertisement, the recommendation detail contents may be advertisement details. Specifically, as shown in FIG. 11, when the recommendation information corresponds to an application advertisement such as a game, the recommendation detail content may be a download page of the application; and when the recommendation information corresponds to a commodity advertisement, the recommendation detail content may be a purchase page of the commodity.

The detail display trigger operation is an operation for triggering the display of the recommendation detail contents of the recommendation information. The detail display trigger operation may be a trigger operation for the displayed recommendation information. For example, the trigger operation may be one of the operations such as a click operation, a long press operation, a drag operation and a double-click operation on the display region of the recommendation information, and specifically may be set according to actual application scenes. The detail display trigger operation may also be a trigger operation detected by a sensor in a mobile terminal. For example, an acceleration sensor of a mobile terminal detects whether there is an acceleration in a certain direction to detect the detail display trigger operation. For example, the user who carries the mobile terminal and jumps or controls and shakes the mobile terminal may cause an acceleration in a certain direction, therefore, the user who carries the mobile terminal and jumps or controls and shakes the mobile terminal may cause the detail display trigger operation.

In a specific application, the recommendation information configured for the target image interval is pushed, so that the recommendation information is displayed as game download recommendation information on the second partial image, specifically including game character information, a game download entry, and the like. When the mobile terminal detects an acceleration in a certain direction through the acceleration sensor or detects a trigger operation for a game download entry, a game download page is displayed.

In this embodiment, by displaying the recommendation information in an image format and the recommendation detail entry during the display of the recommendation information, the display of the recommendation information may be realized from the dimension of brief information. By pushing the recommendation detail contents of the recommendation information in response to the triggered detail display trigger operation, the push of the recommendation information may be realized from the dimension of detailed information. In a case that a partial image of a target panoramic image is projected, the multi-level display of the brief information and the recommendation detail contents may be realized directly through simple interaction, so that the user may obtain the brief information and the recommendation detail contents from different in-depth dimensions, so as to improve the information pushing effectiveness.

In an embodiment, recommendation detail contents of the recommendation information are pushed in response to a detail display trigger operation triggered for the recommendation detail entry during the display of the recommendation detail entry, including: an application page linked to the recommendation information is turned in response to a detail display trigger operation triggered for the recommendation detail entry during the display of the recommendation detail entry; and recommendation detail contents of the recommendation information are displayed in the application page.

The application page is a running page of an application, and is used for displaying the recommendation detail contents of the recommendation information. The application page and the page where the view finding region is located are different pages. Specifically, the application page may be a page for downloading the application corresponding to the recommendation information in the application store, a page for purchasing the commodity corresponding to the recommendation information in the shopping software, or a page when a sub-application corresponding to the recommendation information runs in a parent environment, such as an applet running in a running environment of a social application. The mobile terminal realizes the page turn in response to a detail display trigger operation triggered for the recommendation detail entry during the display of the recommendation detail entry, the application page linked to the recommendation information is displayed on the mobile terminal, and recommendation detail contents of the recommendation information are displayed in the application page.

Specifically, the mobile terminal cancels the display of the second partial image and the recommendation information in response to a detail display trigger operation triggered for the recommendation detail entry during the display of the recommendation detail entry, the application linked to the recommendation information is started and turned, and recommendation detail contents corresponding to the recommendation information are displayed in the running page of the application.

In a specific application, when the mobile terminal detects an acceleration in a vertical direction through the acceleration sensor or detects a trigger operation for the game download entry, the display of the second partial image and the game download entry is canceled, an application download page is displayed, and a game download page is displayed in the application download page.

In this embodiment, through the page turn, the partial image projection page of the panoramic image is turned to the application corresponding to the recommendation information, so that required intermediate operations may be reduced, the response speed may be effectively increased, and the user may obtain the specific recommendation information quickly and conveniently. Furthermore, for the application linked to the recommendation information, user guidance and effective recommendation of information may be realized.

In an embodiment, the information pushing method based on a panoramic image further includes: alternative recommendation information configured for the target image interval is pushed to update the recommendation information displayed on the second partial image to the alternative recommendation information in response to an information updating trigger operation when the target image interval to which the current partial image of the target panoramic image projected into the view finding region belongs is not changed after a predefined time duration (e.g., a few seconds).

There may be multiple recommendation information matched with image intervals, such as main recommendation information displayed for the first time and alternative recommendation information as a substitute. The alternative recommendation information is a replacement object when the recommendation information displayed for the first time, matched with the same image interval, needs to be updated. The information updating trigger operation is an operation for triggering the update of the displayed recommendation information. The information updating trigger operation may be a trigger operation when recommendation information is displayed.

Specifically, when there is alternative recommendation information matched with the target image interval, when the current partial image of the target panoramic image projected into the view finding region is changed, but the target image interval to which the current partial image belongs is not changed, the alternative recommendation information configured for the target image interval is pushed to update the recommendation information displayed on the second partial image to the alternative recommendation information in response to an information updating trigger operation, thereby switching and updating the recommendation information.

In this embodiment, when there is alternative recommendation information matched with the target image interval, by controlling the updating condition of the recommendation information to ensure that the target image interval to which the projected second partial image in the target panoramic image belongs is not changed, the mobile terminal may realize the update of the recommendation information displayed based on the alternative recommendation information in response to the triggered information updating trigger operation under this condition, thereby realizing the switching of different recommendation information in the target image interval and reducing the complexity of data processing required for switching the recommendation information, so as to realize quick update and effective recommendation of information.

In an embodiment, the information pushing method based on a panoramic image further includes: the recommendation information displayed on the current partial image is updated from the first recommendation information configured for the first image interval to the second recommendation information configured for the second image interval in response to an information updating trigger operation when the target image interval where the current partial image of the target panoramic image projected into the view finding region is located changes from a first image interval to a second image interval.

The information updating trigger operation is an operation for triggering the update of the displayed recommendation information. The information updating trigger operation may be a trigger operation when recommendation information is displayed. Specifically, the trigger conditions of the information pushing trigger operation may include the change of the image interval where the partial image of the target panoramic image projected into the view finding region is located from a first image interval to a second image interval, where the first image interval and the second image interval are any two of the multiple image intervals partitioned by the target panoramic image, and specifically may be image intervals adjacent to each other or image intervals not adjacent to each other. The information updating trigger operation may be a trigger operation detected by the sensor in the mobile terminal or a trigger operation of the user for the recommendation information. For example, the acceleration sensor of the mobile terminal detects whether there is an acceleration in a certain direction to detect the information updating trigger operation, and specifically may detect whether the user carries the mobile terminal and jumps or controls and shakes the mobile terminal to determine whether there is an information updating trigger operation.

Figure 9:
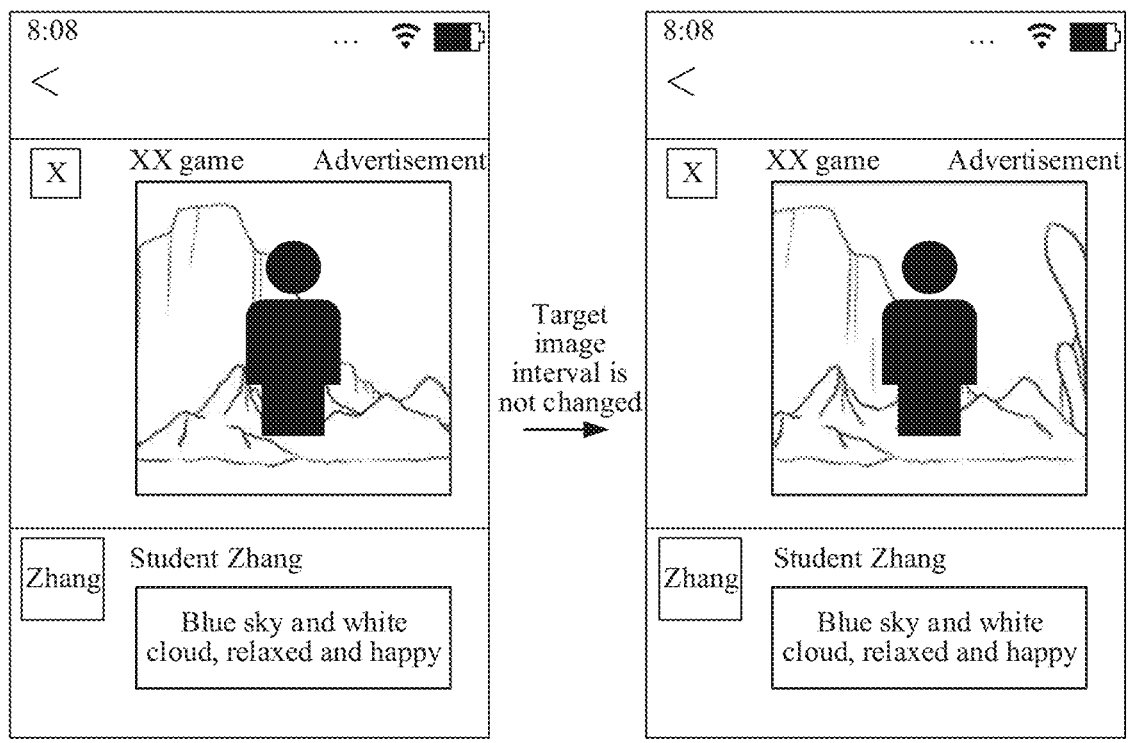
FIG. 9 is a schematic interface diagram of displaying recommendation information when a target image interval is not changed in an embodiment.

The change of the target image interval specifically may be realized when the user controls the mobile terminal or controls the target panoramic image to move to cause the relative displacement between the view finding region and the target panoramic image. For example, as shown in FIG. 9, after the user rotates the mobile terminal and triggers the display of the recommendation information to display the recommendation information on the second partial image, the user rotates the mobile terminal again. At this time, the partial image displayed in the view finding region is changed, but the recommendation information is always displayed. After the user stops rotating, the image interval to which the partial image displayed in the view finding region belongs is changed, that is, when the current image interval is no longer matched with the recommendation information, the information updating trigger operation may be triggered to update the displayed recommendation information based on the recommendation information matched with the current image interval.

Specifically, when the target image interval to which the second partial image of the target panoramic image projected into the view finding region belongs is not changed, during the display of the recommendation information, the information updating trigger operation may not be triggered, or the mobile terminal does not respond to the information updating trigger operation or does not perform the updating process of the recommendation information to save data processing resources. When the target image interval to which the second partial image of the target panoramic image projected into the view finding region belongs is changed, the mobile terminal updates the recommendation information displayed on the current partial image to the recommendation information matched with the changed target image interval in response to the triggered information updating trigger operation during the display of the recommendation information, so that the mobile terminal may realize the update of the recommendation information in response to the triggered information updating trigger operation when updating conditions are met.

Figure 10:
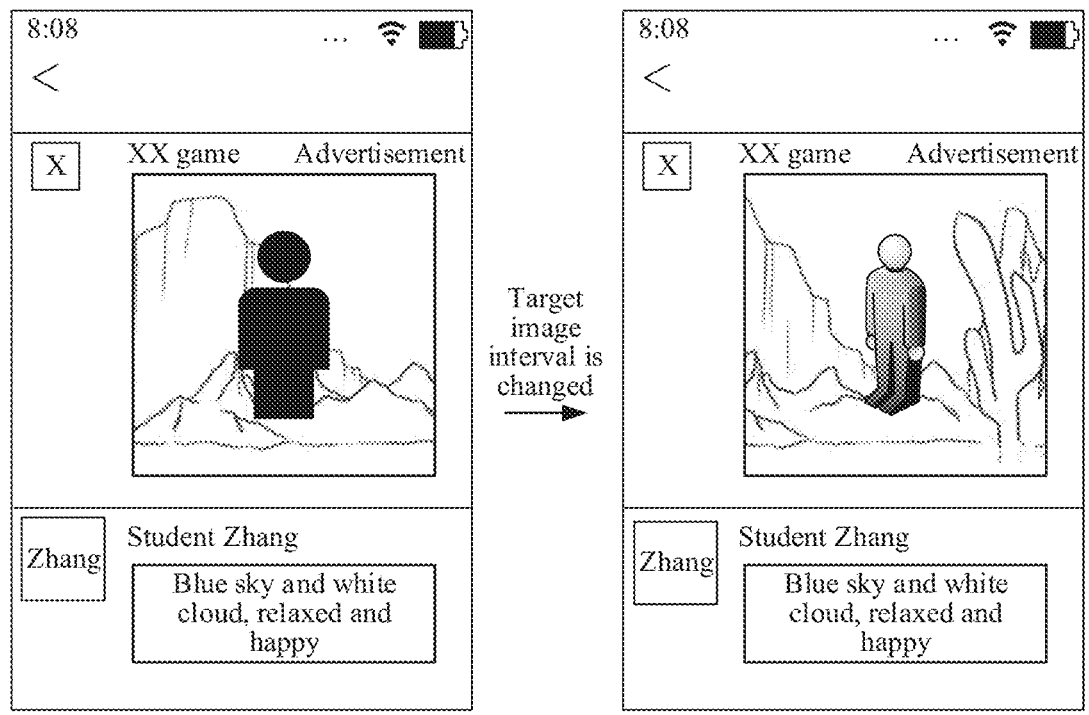
FIG. 10 is a schematic interface diagram of displaying recommendation information when a target image interval is changed in an embodiment.

In a specific application, as shown in FIG. 10, taking a game advertisement as an example, the user performs the information pushing trigger operation, so that a "game character A" matched with the first image interval is displayed in the view finding region, and the user rotates the mobile terminal. If the image interval to which the current partial image belongs after rotation is still the first image interval, the displayed "game character A" is not updated, and the user rotates the mobile terminal again. If the image interval to which the current partial image belongs after rotation is the second image interval, the displayed "game character A" is replaced with a "game character B" matched with the second image interval.

In this embodiment, by controlling the updating condition of the recommendation information to ensure that the target image interval to which the second partial image in the target panoramic image belongs is changed, the mobile terminal may realize the update of the recommendation information based on the recommendation information matched with different target image intervals in response to the triggered information updating trigger operation under this condition, thereby displaying different recommendation information for different target image intervals, realizing quick matching of the recommendation information to be switched, and simplifying the determination process of the recommendation information to be switched, so as to realize quick update and effective recommendation of information.

In an embodiment, recommendation detail contents of the recommendation information are pushed in response to a detail display trigger operation triggered for the recommendation detail entry during the display of the recommendation detail entry, including: recommendation detail contents of the recommendation information are displayed in a recommendation content display region in a display page where the view finding region is located in response to a detail display trigger operation triggered for the recommendation detail entry during the display of the recommendation detail entry.

The recommendation content display region is a part of region in the display page where the view finding region is located except the view finding region. The recommendation content display region and the view finding region are displayed in a same page. Specifically, the recommendation content display region may be overlapped with the view finding region. For example, the recommendation content display region is displayed above the view finding region in a superimposed mode, when the user triggers to cancel the display of the recommendation content display region, the interaction may be performed based on the view finding region. The recommendation content display region may also be a peripheral region of the view finding region. For example, the recommendation content display region is displayed above or below the view finding region. Recommendation detail contents may be displayed in the peripheral region of the view finding region, the recommendation detail contents may be obtained, and at the same time, the interaction may also be performed based on the view finding region.

Specifically, the mobile terminal displays recommendation detail contents of the recommendation information in a recommendation content display region in a display page where the view finding region is located in response to a detail display trigger operation triggered for the recommendation detail entry during the display of the recommendation detail entry. A display canceling entry is also displayed in the recommendation content display region, and the mobile terminal may cancel the display of the recommendation content display region in response to a trigger operation of the user for the display canceling entry.

In this embodiment, by displaying the recommendation content display region and the view finding region in the same page, the user may obtain the recommendation detail contents and trigger the display of other recommendation information without page switching. By avoiding page switching, the process of configuring page parameters for information display by the mobile terminal may be simplified, and the convenience for obtaining information by the user may be improved, thereby facilitating the effective recommendation of multiple recommendation information.

In an embodiment, the information pushing method based on a panoramic image further includes: a panoramic image identifier is displayed in a display page of the mobile terminal; and a first partial image of the target panoramic image projected into the view finding region is displayed in the view finding region displayed by the mobile terminal, including: a first partial image of the target panoramic image projected into the view finding region is displayed in the view finding region displayed by the mobile terminal in response to a trigger operation for the panoramic image identifier, where the panoramic image identifier is an image identifier of the target panoramic image.

The panoramic image identifier is used for representing and distinguishing different panoramic images. The panoramic image identifier specifically may be a trigger entry including the corresponding information of a panoramic image, and the corresponding information of the panoramic image may be the name of the panoramic image, the type of the panoramic image, and the like. For example, for game enthusiasts, the possibility of triggering a panoramic image of a game type is greater than that of a home type. For another example, for A type game enthusiasts, the possibility of triggering the panoramic image corresponding to the A type game is greater than the possibility of triggering the panoramic image corresponding to the B type game. By identifying the type of the panoramic image, it is convenient for the user to select an interested panoramic image and increase the possibility of triggering the start of the target panoramic image by the user, thereby increasing the possibility of successful recommendation of the recommendation information.

The first partial image is a partial image corresponding to the preset projection center in the target panoramic image. By presetting the projection center, it may be ensured that when different mobile terminals or the same mobile terminal starts the target panoramic image in different orientations, the displayed first partial images are the same, so as to ensure that the relative displacement between the view finding region and the target panoramic image each time is implemented based on the same conditions, thereby ensuring that the recommendation information corresponding to each target image interval has a specific order, which is conducive to the reasonable distribution of the recommendation information.

In a specific application, multiple candidate panoramic image identifiers are displayed in the display page of the mobile terminal, the mobile terminal selects a target panoramic image identifier in response to a selecting operation of the user for the candidate panoramic image identifiers, and a first partial image of the target panoramic image projected into the view finding region corresponding to the target panoramic image identifier is displayed in the view finding region displayed by the mobile terminal.

In this embodiment, the panoramic image identifier is triggered to start the partial image projection of the target panoramic image and display the first partial image, so as to ensure that when different mobile terminals or the same mobile terminal starts the target panoramic image in different orientations, the first partial images displayed by the mobile terminal are the same, thereby being beneficial to realize the reasonable distribution of the recommendation information and expand the applicability of different mobile terminals to the foregoing method.

In an embodiment, the target image interval is a first image interval. The information pushing method based on a panoramic image further includes: a third partial image of the target panoramic image projected into the view finding region after the second displacement is displayed in the view finding region after the second displacement in response to the second displacement of the view finding region relative to the target panoramic image; and the display of the recommendation information matched with the first image interval is canceled and the recommendation information matched with the second image interval is displayed on the third partial image when the third partial image belongs to a second image interval of the target panoramic image.

Figure 12:
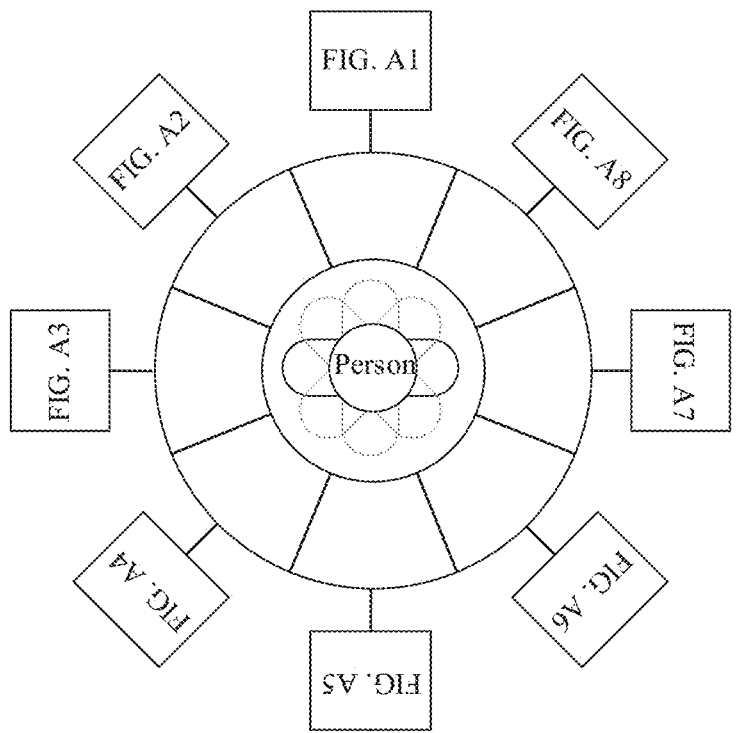
FIG. 12 is a schematic diagram of a matching relationship between an image interval and recommendation information in an embodiment.

Each of the first image interval and the second image interval is one of the image intervals of the target panoramic image. Multiple image intervals may be obtained by performing the interval partition of the target panoramic image. The interval partition of the target image may be equidistant partition, that is, the size of each image interval obtained by partition is the same. The interval partition of the target image may be non-equidistant partition, that is, the size of each image interval obtained by partition may be different. The specific interval partition mode may be adjusted according to actual needs. If it is necessary to make the image intervals corresponding to different recommendation information equal, for example, as shown in FIG. 12, a 360° circular panoramic image is partitioned into 8 image intervals, where the recommendation information displayed within the scope of [0°, 45° ] is shown in FIG. A1; the recommendation information displayed within the scope of [45°, 9001 is shown in FIG. A2; . . . ; the recommendation information displayed within the scope of [270°, 315° ] is shown in FIG. A7; and the recommendation information displayed within the scope of 1315°, 360° ] is shown in FIG. A8.

The second displacement refers to the displacement of the view finding region relative to the target panoramic image when the recommendation information is displayed. It can be understood that the displacement and the second displacement are the displacement of the view finding region relative to the target panoramic image, and the specific mode of generating the displacement may be the same. The displacement and the second displacement aim to distinguish the time when the displacement occurs before and after the recommendation information is displayed. After the second displacement, the partial image of the target panoramic image projected into the view finding region is a third partial image, that is, the partial image will change based on the generated relative displacement.

Specifically, when the recommendation information is displayed on the second partial region, the mobile terminal detects the displacement of the view finding region relative to the target panoramic image. When detecting that there is a relative displacement, the mobile terminal further determines whether the image interval to which the third partial image of the target panoramic image projected into the view finding region belongs is changed after the relative displacement. If the image interval is changed, the recommendation information displayed on the third partial image is replaced with the recommendation information matched with the changed image interval. If the image interval is not changed, the recommendation information matched with the original image interval is displayed on the third partial image.

In a specific application, when the first recommendation information "game character A" matched with the first image interval is displayed on the second partial region, the gyroscope sensor of the mobile terminal detects that the orientation of the mobile terminal is changed or the user performs a drag operation for the partial image displayed in the view finding region. After determining that there is a displacement of the view finding region relative to the target panoramic image, the mobile terminal further determines the image interval to which the third partial image of the target panoramic image projected into the view finding region belongs. If the image interval is still the first image interval, the "game character A" is displayed on the third partial image. If the image interval is the second image interval, the "game character B" matched with the second image interval is displayed on the third partial image. As a result, the recommendation information displayed on the partial image is updated based on the change of the image interval of the partial image displayed by projection.

In this embodiment, in response to the second displacement when the recommendation information is displayed, when the image interval to which the projected third partial region belongs after the second displacement changes from the first image interval to the second image interval, the recommendation information may be updated to the recommendation information matched with the second image interval. The update of the recommendation information is realized based on convenient operations, and different recommendation information is displayed for different image intervals of the generated displacement, thereby realizing the diversified display of the recommendation information and improving the information pushing effect.

In an embodiment, recommendation information configured for the target image interval is pushed to display the recommendation information on the second partial image when the second partial image is located in a target image interval of the target panoramic image, including: recommendation information configured for the target image interval is pushed to display the recommendation information on the second partial image in response to an information pushing trigger operation triggered during the display of the second partial image when the second partial image belongs to a target image interval of the target panoramic image.

The information pushing trigger operation is an operation for triggering the display of recommendation information. The information pushing trigger operation may be a trigger operation when a partial image is displayed. Specifically, the information pushing trigger operation may be used for triggering a partial image, such as a click operation and a long press operation. The information pushing trigger operation may also be a trigger operation detected by a sensor in a mobile terminal. For example, an acceleration sensor of a mobile terminal detects whether there is an acceleration in a certain direction to detect the detail display trigger operation. For example, the user who carries the mobile terminal and jumps or controls and shakes the mobile terminal may cause an acceleration in a certain direction, therefore, the user who carries the mobile terminal and jumps or controls and shakes the mobile terminal may cause the detail display trigger operation.

Specifically, the mobile terminal displays a first partial image of the target panoramic image projected into the view finding region in the view finding region displayed by the mobile terminal in response to a starting operation for the target panoramic image; and the mobile terminal displays a second partial image of the target panoramic image projected into the displaced view finding region in the displaced view finding region in response to the displacement of the view finding region relative to the target panoramic image.

It is to be understood that the displayed second partial image will change with the displacement. Recommendation information configured for the target image interval is pushed to display the recommendation information on the second partial image in response to an information pushing trigger operation triggered during the display of the second partial image when the second partial image belongs to a target image interval of the target panoramic image. In other words, the recommendation information is displayed based on the information pushing trigger operation. The mobile terminal detects the target image interval to which the displayed partial image belongs when the information pushing trigger operation occurs, thereby determining that the recommendation information to be displayed is the recommendation information matched with the target image interval, and displaying the recommendation information on the second partial image. The displayed recommendation information may be updated based on the change of the image interval to which the displayed partial image belongs. The displayed recommendation information may also be updated in response to the information updating trigger operation, and specifically may be set according to actual scene needs.

In a specific application, the user clicks to trigger the projection display of a game panoramic image to display a first partial image of the game panoramic image projected into the view finding region in the view finding region displayed by the mobile terminal. When the gyroscope sensor of the mobile terminal detects that the orientation of the mobile terminal is changed or the user performs a drag operation for the partial image displayed in the view finding region, a second partial image of the target panoramic image projected into the displaced view finding region is displayed in the displaced view finding region corresponding to the foregoing orientation change or drag operation. If the second partial image belongs to the first image interval of the target panoramic image, when the mobile terminal detects that there is an acceleration in a target direction through the built-in acceleration sensor, for example, the user carries the mobile terminal and jumps or controls and shakes the mobile terminal, the recommendation information "game character A" matched with the first image interval is displayed on the second partial image.

Further, the gyroscope sensor of the mobile terminal may detect that the orientation of the mobile terminal is changed or the user performs a drag operation for the partial image displayed in the view finding region, and whether the displayed recommendation information is updated is determined based on whether the image interval to which the third partial image of the target panoramic image projected into the view finding region belongs is changed. If the image interval is still the first image interval, the "game character A" is displayed on the third partial image. If the image interval is the second image interval, the "game character B" matched with the second image interval is displayed on the third partial image. As a result, the recommendation information displayed on the partial image is updated based on the change of the image interval of the partial image displayed by projection.

Further, the mobile terminal may also determine whether to update the displayed recommendation information based on whether to trigger the information updating trigger operation when the recommendation information is displayed. In response to triggering the information updating trigger operation, the mobile terminal displays a target partial image projected into the view finding region when the information updating trigger operation is triggered in the view finding region. Therefore, the displayed recommendation information is updated to the recommendation information matched with the target image interval to which the target partial image belongs in the target partial image.

In this embodiment, the recommendation information configured for the target image interval is pushed to display the recommendation information on the second partial image in response to the information pushing trigger operation triggered by the user during the display of the second partial image. The display occasion of the recommendation information is determined by the user, and the recommendation information is displayed through the information pushing trigger operation triggered by the user, thereby enhancing the interaction in the information pushing process, improving the degree of participation of the user in the information pushing process, and further attracting the attention of the user, so as to improve the information pushing effectiveness.

In an embodiment, recommendation information configured for the target image interval is pushed to display the recommendation information on the second partial image in response to an information pushing trigger operation triggered during the display of the second partial image when the second partial image belongs to a target image interval of the target panoramic image, including:

recommendation information configured for the target image interval is pushed to display the recommendation information on the second partial image in response to the movement of the mobile terminal in a target direction during the display of the second partial image when the second partial image belongs to a target image interval of the target panoramic image.

The target direction may be any direction that may be detected by the mobile terminal. Specifically, the movement in the target direction may be the movement in the direction of gravity, or the reciprocating movement in a certain direction. The reciprocating movement refers to the process that the user controls the mobile terminal to move from a position A to a position B in a certain direction and then return to the position A. In a specific application, the reciprocating movement may be a shaking or up-and-down wobbling action of the operation user of the mobile terminal to the mobile terminal, or a jumping action of the operation user of the mobile terminal carrying the mobile terminal, where the jumping action may be an upward jumping action or a forward or backward jumping action. Since the height of the user relative to the ground changes and recovers during the jumping, regardless of the upward jumping action or the forward or backward jumping action, the movement in a vertical direction belongs to the reciprocating movement. The shaking action is a reciprocating movement without limiting a movement direction, and the up-and-down wobbling action is a reciprocating movement in a vertical direction.

In a specific application, when the second partial image belongs to the target image interval of the target panoramic image, the mobile terminal detects and responds to the jumping action of the user holding the mobile terminal through the built-in gyroscope sensor to push the recommendation information configured for the target image interval, so that the recommendation information is displayed on the second partial image. For example, the user jumps to display an advertisement image matched with the target image interval.

In this embodiment, by displaying the recommendation information when the mobile terminal moves back and forth in the target direction, for example, when the user jumps, the mobile terminal may perform accurate detection through devices such as the built-in gyroscope sensor to realize quick and accurate response, and may create the effect that the jumping behavior of the user triggers the display of the recommendation information to realize more interactive and immersive experience.

In an embodiment, the information pushing method based on a panoramic image further includes: the display of the recommendation information matched with the target image interval is canceled on the second partial image in response to the movement of the mobile terminal in a target direction during the display of the recommendation information.

The target direction may be any direction that may be detected by the mobile terminal. Specifically, the target direction may be the same as or different from the target direction corresponding to the display trigger operation of the recommendation information. Specifically, the display trigger operation and the display canceling trigger operation of the recommendation information have the same type, and may enable the user to display the recommendation information and cancel the display of the recommendation information based on the same action. The operation is simple and easy, and is convenient for the user to continue to obtain other recommendation information, thus improving the recommendation effect of the information.

This application further provides an application scene which uses the foregoing information pushing method based on a panoramic image. Specifically, the application of the information pushing method based on a panoramic image in this application scene is as follows:

Specific application scenes may be information flows, screen opening and live advertisement scenes based on the mobile terminal. The information pushing method based on a panoramic image realizes a new game-based interactive advertisement display form.

Specifically, during advertising, advertisers need to upload a 360° or 720° panoramic picture A and multiple advertisement pictures A1, A2, A3, A4, and the like triggered from different angles as recommendation information during projection of a panoramic advertisement picture, and each advertisement picture corresponds to an angle interval. The user may use a picture tool for editing and designing or use a panoramic camera to obtain a 360° or 720° panoramic picture required for the material as an advertisement material.

Figure 13:
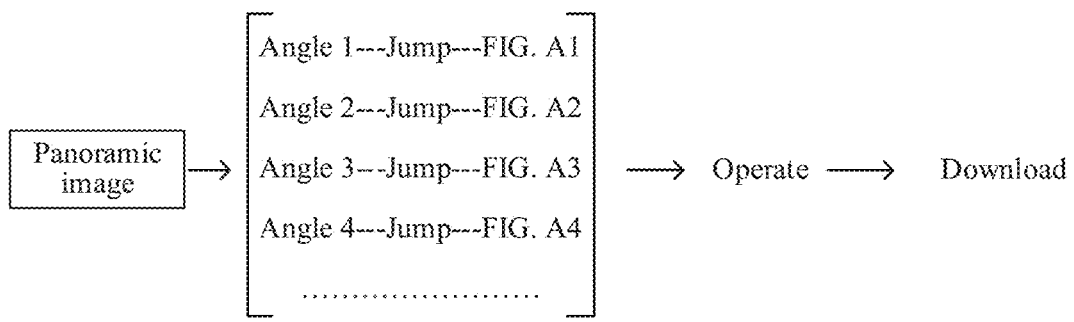
FIG. 13 is a schematic flowchart of displaying recommendation information by triggering in an embodiment.

As shown in FIG. 13, taking a mobile phone as a mobile terminal, when the user raises the mobile phone and turns a circle, the panoramic picture A moves in the view finding region on the screen of the mobile phone, that is, in an advertising space. When the panoramic picture A moves to an angle in a horizontal direction, when the mobile phone detects the jumping action of the user (or the shaking or up-and-down wobbling action of a mobile phone operator) through the built-in acceleration sensor, for example, when the user jumps up, the advertisement picture corresponding to the angle interval where the angle in the horizontal direction is located is triggered. When the advertisement picture is displayed, the application corresponding to the advertisement picture is downloaded by detecting the operation of the user for the advertisement picture.

Thus, this creates the effect that the turning and jumping behavior of the user triggers the partial projection of the advertisement content with the panoramic picture A, which is changed into an advertisement picture A1 or A2 or A3 or A4, so as to realize more interactive and immersive experience.

Figure 14:
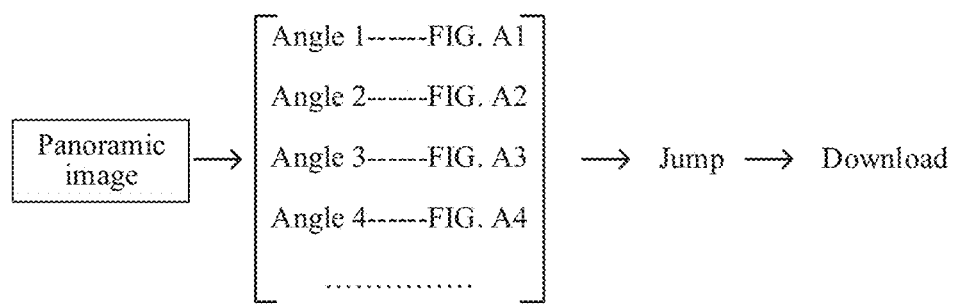
FIG. 14 is a schematic flowchart of automatically displaying recommendation information in an embodiment.

In another embodiment, as shown in FIG. 14, the partial projection of the panoramic picture A changes with the movement of the mobile phone in the advertising space on the screen of the mobile phone. When the mobile phone moves to a certain angle in the horizontal direction and stops moving, the advertisement picture corresponding to the angle interval where the angle in the horizontal direction is located may be triggered directly. When the advertisement picture is displayed, the application corresponding to the advertisement picture is downloaded by detecting the jumping behavior of the user.

In a specific use process, the user clicks the panoramic picture on the advertising space at the front end of the mobile phone, and an initial picture scene projected by the panoramic picture is displayed on the screen of the mobile phone. The panoramic picture includes many picture scenes, and each picture scene corresponds to an angle of the panoramic picture. The specific angle value may be an angle relative to the initial picture scene or an angle relative to other reference points. One picture scene may be displayed on the screen of the mobile phone each time.

Taking a panoramic picture with M degrees as an example, N advertisement pictures are evenly distributed on the panoramic picture. For example, an advertisement picture 1 corresponds to an angle of 1-30 degrees, an advertisement picture 2 corresponds to an angle of 30-60 degrees, an advertisement picture 3 corresponds to an angle of 60-90 degrees, and so on. Starting from an initial picture scene, when the user holds the mobile phone and rotates an angle a and the jumping behavior of the user is detected, a processor of the mobile phone will determine an angle interval corresponding to the picture scene after rotating the angle a, and display the advertisement picture associated with the angle interval. For example, if the angle a is 45 degrees, the advertisement picture 2 is displayed.

When an advertisement picture is displayed on the advertising space of the mobile phone, when the user clicks the advertisement picture or triggers the download entry, or the mobile phone detects the jumping action of the user again through the built-in acceleration sensor, it triggers to turn to a detail page corresponding to the advertisement picture. For example, when the displayed advertisement picture is a game advertisement, it turns to a game download page.

Specific implementation processes are as follows: the advertising space on the mobile phone first displays the picture scene projected by the panoramic picture, and the picture scene will change with the movement angle of the mobile phone. When the picture scene moves to a certain angle, the processor of the mobile phone retrieves the corresponding advertisement picture to be displayed in the current picture scene based on the matching relationship between the angle interval to which the angle belongs and the advertisement picture. When the advertisement picture is displayed, if the built-in acceleration sensor of the mobile phone detects the jumping behavior of the user, it will enter the detail page corresponding to the advertisement picture, for example, turn to the game download page to download the game. If the built-in gyroscope sensor of the mobile phone detects that the user continues to rotate to the next angle, the processor of the mobile phone will retrieve the corresponding advertisement picture to update the displayed advertisement picture based on the matching relationship between the angle interval to which the angle belongs and the advertisement picture. For the updated advertisement picture, the jumping behavior of the user may be detected to enter the corresponding detail page.

The detection of the rotation angle of the mobile phone and the jumping behavior of the user during the foregoing processing may be realized by the gyroscope sensor and the acceleration sensor respectively. The acceleration sensor may obtain the direction of the acceleration of gravity and the speed of the mobile phone in the 3D space by the integration of the acceleration in time, so as to detect the jumping behavior of the user holding the mobile phone. The gyroscope sensor is a sensor for obtaining the angular speed of the mobile phone in the 3D space, and may obtain the variation of the posture of the mobile phone by the integration of the angular speed in time, so as to obtain the perspective rotation action of the user holding the mobile phone.

In a specific application, the user clicks the panoramic picture on the advertising space at the front end, and an initial picture scene projected by the panoramic picture is displayed on the screen of the mobile phone, where the initial picture scene specifically may be a picture scene corresponding to the 0 degree in the panoramic picture. When the user holds and rotates the mobile phone, the gyroscope sensor of the mobile phone detects a rotation angle a, and the mobile phone will adjust the picture scene displayed by the panoramic picture projection according to the angle a. When the user stops rotating the mobile phone and jumps, the screen of the mobile phone displays the picture scene A of the panoramic picture. The mobile phone detects the jumping behavior of the user through the acceleration sensor, determines the advertisement picture corresponding to the picture scene A according to the angle a, and displays the advertisement picture on the picture scene A in a superimposed mode. At this time, the user may return to the picture scene A through the jumping behavior again. Starting from the picture scene A, the user rotates an angle b, a picture scene B is displayed on the screen of the mobile phone, and the mobile phone determines the corresponding advertisement picture (that is, the advertisement picture associated with the picture scene B) according to the angle a+b, and displays the advertisement picture on the picture scene B in a superimposed mode.

Figure 15:
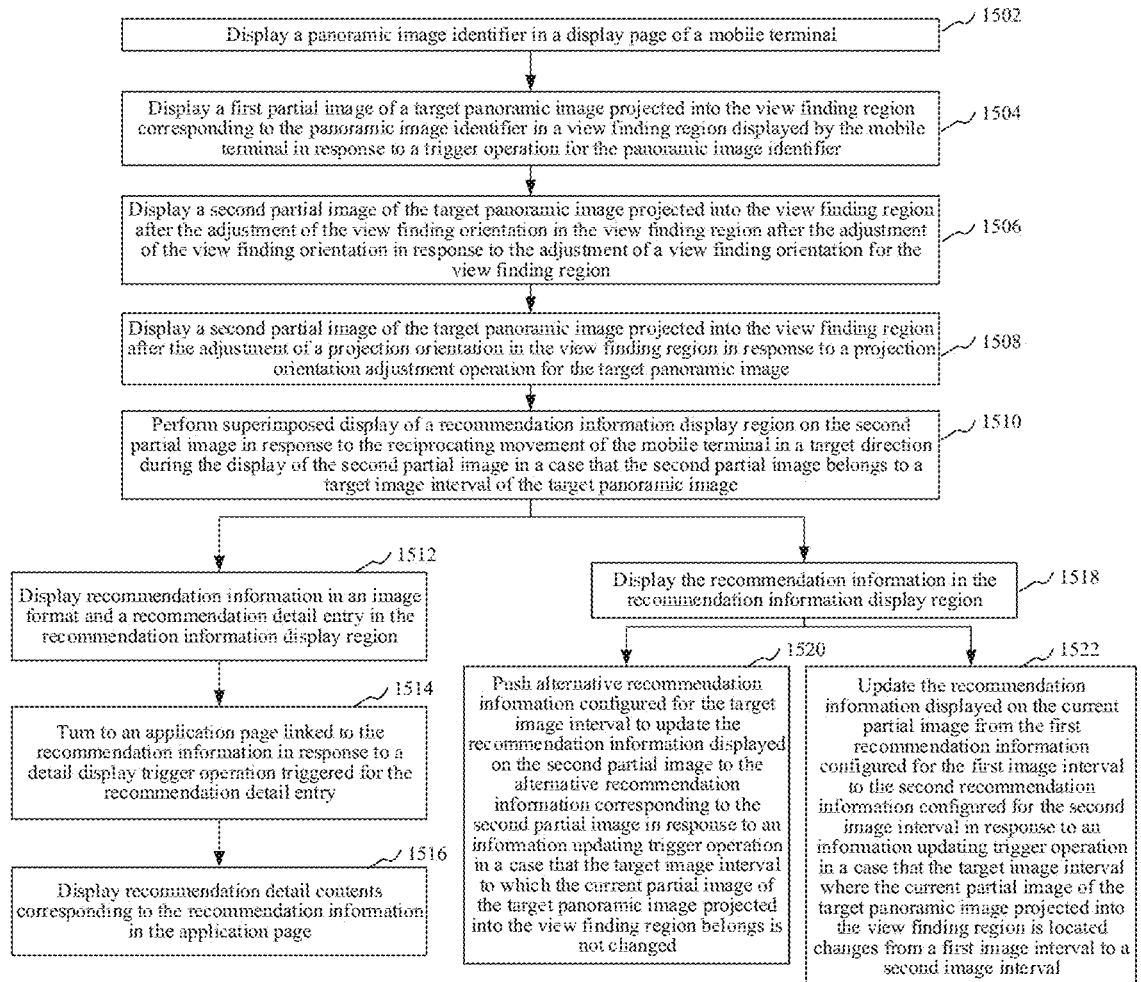
FIG. 15 is a schematic flowchart of an information pushing method based on a panoramic image in another embodiment.

In an embodiment, as shown in FIG. 15, FIG. 15 provides an information pushing method based on a panoramic image, including the following steps:

Step 1502: Display a panoramic image identifier in a display page of a mobile terminal.

Step 1504: Display a first partial image of a target panoramic image projected into the view finding region corresponding to the panoramic image identifier in a view finding region displayed by the mobile terminal in response to a trigger operation for the panoramic image identifier.

Step 1506: Display a second partial image of the target panoramic image projected into the view finding region after the adjustment of the view finding orientation in the view finding region after the adjustment of the view finding orientation in response to the adjustment of a view finding orientation for the view finding region.

Step 1508: Display a second partial image of the target panoramic image projected into the view finding region after the adjustment of a projection orientation in the view finding region in response to a projection orientation adjustment operation for the target panoramic image.

Step 1510: Perform superimposed display of a recommendation information display region on the second partial image in response to the reciprocating movement of the mobile terminal in a target direction during the display of the second partial image when the second partial image belongs to a target image interval of the target panoramic image, and turn to step 1512 or step 1518.

Step 1512: Display recommendation information in an image format and a recommendation detail entry in the recommendation information display region.

Step 1514: Turn to an application page linked to the recommendation information in response to a detail display trigger operation triggered for the recommendation detail entry.

Step 1516: Display recommendation detail contents of the recommendation information in the application page.

Step 1518: Display the recommendation information in the recommendation information display region.

Step 1520: Push alternative recommendation information configured for the target image interval to update the recommendation information displayed on the second partial image to the alternative recommendation information in response to an information updating trigger operation when the target image interval to which the current partial image of the target panoramic image projected into the view finding region belongs is not changed.

Step 1522: Update the recommendation information displayed on the current partial image from the first recommendation information configured for the first image interval to the second recommendation information configured for the second image interval in response to an information updating trigger operation when the target image interval where the current partial image of the target panoramic image projected into the view finding region is located changes from a first image interval to a second image interval.

It is to be understood that although the steps in the flowcharts of FIG. 2 and FIG. 15 are displayed in sequence as indicated by arrows, these steps are not necessarily executed in sequence according to the order indicated by the arrows. Unless there is a clear description herein, there is no strict order limitation on the execution of these steps, and these steps may be executed in other orders. Furthermore, at least part of the steps in FIG. 2 and FIG. 15 may include multiple steps or multiple stages, these steps or stages are not necessarily executed at the same time, but may be executed at different times, and these steps or stages are not necessarily executed in sequence, but may be executed in turn or alternately with other steps or at least part of the steps or stages in other steps.

Figure 16:
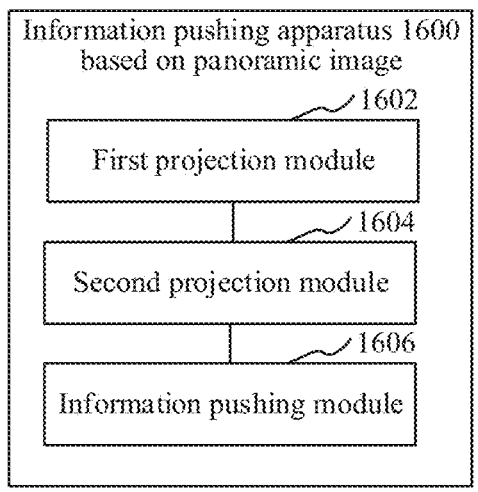
FIG. 16 is a structural block diagram of an information pushing apparatus based on a panoramic image in an embodiment.

In an embodiment, as shown in FIG. 16, an information pushing apparatus 1600 based on a panoramic image is provided. The apparatus may be a software module or a hardware module, or a combination of the two to become a part of a mobile terminal. The apparatus specifically includes a first projection module 1602, a second projection module 1604 and an information pushing module 1606, where the first projection module 1602 is configured to display a first partial image of a target panoramic image projected into the view finding region in a view finding region displayed by a mobile terminal;

the second projection module 1604 is configured to display a second partial image of the target panoramic image projected into the displaced view finding region in the displaced view finding region in response to the displacement of the view finding region relative to the target panoramic image, and the information pushing module 1606 is configured to push recommendation information configured for the target image interval to display the recommendation information on the second partial image when the second partial image belongs to a target image interval of the target panoramic image.

In an embodiment, the information pushing module further includes a superimposed display unit and a recommendation information display unit, where the superimposed display unit is configured to perform superimposed display of a recommendation information display region on the second partial image; and the recommendation information display unit is configured to display recommendation information and a recommendation detail entry in the recommendation information display region. The information pushing apparatus based on a panoramic image further includes a recommendation detail display module configured to push recommendation detail contents of the recommendation information in response to a detail display trigger operation triggered for the recommendation detail entry during the display of the recommendation detail entry.

In an embodiment, the recommendation detail display module includes an application page display unit and a recommendation detail content display unit, where the application page display unit is configured to turn to an application page linked to the recommendation information in response to a detail display trigger operation triggered for the recommendation detail entry during the display of the recommendation detail entry, and the recommendation detail content display unit is configured to display recommendation detail contents of the recommendation information in the application page.

In an embodiment, the recommendation detail display module is further configured to display recommendation detail contents of the recommendation information in a recommendation content display region in a display page where the view finding region is located in response to a detail display trigger operation triggered for the recommendation detail entry during the display of the recommendation detail entry.

In an embodiment, the second projection module is further configured to display a second partial image of the target panoramic image projected into the view finding region after the adjustment of the view finding orientation in the view finding region after the adjustment of the view finding orientation in response to the adjustment of a view finding orientation for the view finding region.

In an embodiment, the second projection module is further configured to display a second partial image of the target panoramic image projected into the view finding region after the adjustment of a projection orientation in the view finding region in response to a projection orientation adjustment operation for the target panoramic image.

In an embodiment, the information pushing apparatus based on a panoramic image further includes a recommendation information updating module, where the recommendation information updating module is configured to display alternative recommendation information matched with the target image interval on the second partial image in response to an information updating trigger operation triggered during the display of the recommendation information when the target image interval to which the current partial image of the target panoramic image projected into the view finding region belongs is not changed.

In an embodiment, the information pushing apparatus based on a panoramic image further includes a recommendation information updating module, where the recommendation information updating module is configured to display recommendation information matched with the changed target image interval on the current partial image in response to an information updating trigger operation triggered during the display of the recommendation information when the target image interval to which the current partial image of the target panoramic image projected into the view finding region belongs is changed.

In an embodiment, the target image interval is a first image interval. The information pushing apparatus based on a panoramic image further includes a third projection module and a recommendation information updating module, where the third projection module is configured to display a third partial image of the target panoramic image projected into the view finding region after the second displacement in the view finding region after the second displacement in response to the second displacement of the view finding region relative to the target panoramic image; and the recommendation information updating module is configured to cancel the display of the recommendation information matched with the first image interval and display the recommendation information matched with the second image interval on the third partial image when the third partial image belongs to a second image interval of the target panoramic image.

In an embodiment, the information pushing module is further configured to push recommendation information configured for the target image interval to display the recommendation information on the second partial image in response to an information pushing trigger operation triggered during the display of the second partial image when the second partial image belongs to a target image interval of the target panoramic image.

In an embodiment, the information pushing module is further configured to push recommendation information configured for the target image interval to display the recommendation information on the second partial image in response to the reciprocating movement of the mobile terminal in a target direction during the display of the second partial image when the second partial image belongs to a target image interval of the target panoramic image.

In an embodiment, an information canceling display module is further configured to cancel the display of the recommendation information matched with the target image interval on the second partial image in response to the movement of the mobile terminal in a target direction during the display of the recommendation information.

In an embodiment, the recommendation information includes a 3D image. The information pushing module is further configured to display a first perspective image of the 3D image projected into the view finding region on the second partial image.

The information pushing apparatus based on a panoramic image further includes a perspective conversion module configured to display a second perspective image of the 3D image projected into the view finding region after the perspective offset on the second partial image in response to the perspective offset of the 3D image relative to the view finding region.

In an embodiment, the information pushing apparatus based on a panoramic image further includes a panoramic image identifier display module, where the panoramic image identifier display module is configured to display candidate panoramic image identifiers in a display page of the mobile terminal.

The first projection module is further configured to display a first partial image of the target panoramic image projected into the view finding region in a view finding region of the mobile terminal in response to a selecting operation for a target panoramic image identifier in the candidate panoramic image identifiers, where the target panoramic image identifier is an image identifier of the target panoramic image.

In an embodiment, the view finding region is a promotion information display page. The information pushing apparatus based on a panoramic image includes a promotion information display page display module configured to display a promotion information display page corresponding to the target application in response to a starting operation for a target application. The first projection module is further configured to display a first partial image of the target panoramic image projected into the view finding region in the promotion information display page.

In an embodiment, the view finding region is a promotion information display page. The information pushing apparatus based on a panoramic image includes a promotion information display region display module configured to display a promotion information display region in an information flow display page of a target application. The first projection module is further configured to display a first partial image of the target panoramic image projected into the view finding region in the promotion information display region.

The specific embodiments of the information pushing apparatus based on a panoramic image may refer to the embodiments of the information pushing method based on a panoramic image above, and will not be repeated here. Each module in the foregoing information pushing apparatus based on a panoramic image may be implemented fully or partially by software, hardware and a combination of software and hardware. Each of the foregoing modules may be embedded in a processor in a mobile terminal in the form of hardware or independent of a processor in a mobile terminal, or may be stored in a memory in a mobile terminal in the form of software, so that the processor may invoke and execute the operation corresponding to each of the foregoing modules.

Figure 17:
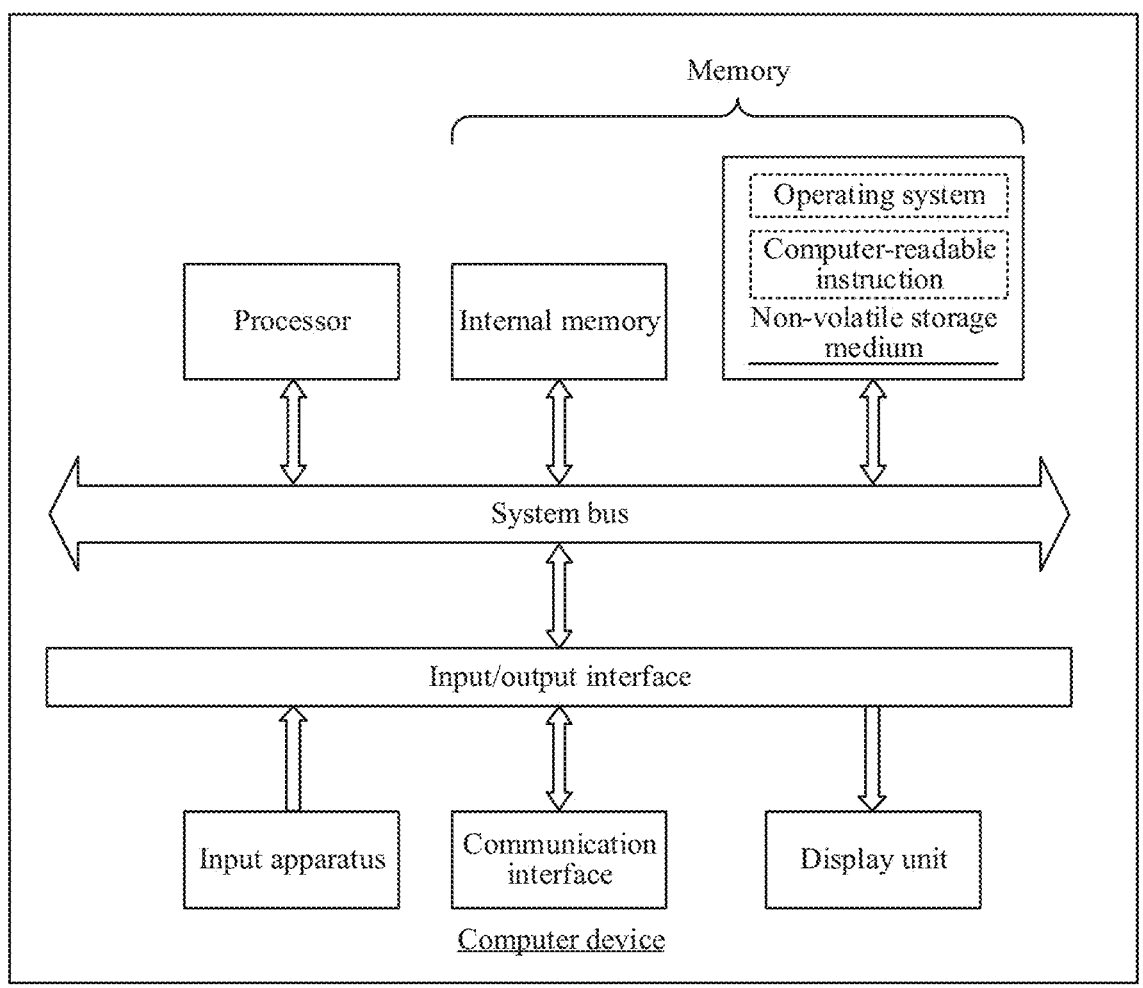
FIG. 17 is an internal structure diagram of a mobile terminal in an embodiment.

In an embodiment, a mobile terminal is provided, and an internal structure diagram of the mobile terminal may be shown in FIG. 17. The mobile terminal includes a processor, a memory, a communication interface, a display screen and an input apparatus which are connected through a system bus, where the processor of the mobile terminal is configured to provide computation and control abilities. The memory of the mobile terminal includes a non-transitory computer-readable storage medium and an internal memory. The non-transitory computer-readable storage medium stores an operating system and computer-readable instructions. The internal memory provides an environment for the operation of the operating system and computer-readable instructions in the non-transitory computer-readable storage medium. The communication interface of the mobile terminal is used for wired or wireless communication with an external terminal. The wireless mode may be implemented through WIFI, operator networks, near field communication (NFC) or other technologies. The computer-readable instructions, when executed by the processor, implement an information pushing method based on a panoramic image. The display screen of the mobile terminal may be a liquid crystal display screen or an electronic ink display screen. The input apparatus of the mobile terminal may be a touch layer covered on the display screen, or a key, trackball or touchpad arranged on a housing of the mobile terminal, or an external keyboard, touchpad, mouse, or the like.

Those skilled in the art can understand that the structure shown in FIG. 17 is only a block diagram of a part of the structure related to the solution of this application, and does not constitute a limitation on the mobile terminal applied to the solution of this application. A specific mobile terminal may include more or fewer components than shown in the figure, or combine some components, or have different component arrangements.

In an embodiment, a mobile terminal is further provided, including a memory and a processor. The memory stores computer-readable instructions. The computer-readable instructions, when executed by the processor, implement the steps in the foregoing method embodiments.

In an embodiment, a computer-readable storage medium is provided, storing computer-readable instructions. The computer-readable instructions, when executed by the processor, implement the steps in the foregoing method embodiments.

In an embodiment, a computer-readable instruction product or computer-readable instruction is provided. The computer-readable instruction product or computer-readable instruction includes a computer instruction, and the computer instruction is stored in a computer-readable storage medium. A processor of a mobile terminal reads the computer instruction from the computer-readable storage medium, and the processor executes the computer instruction, so that the mobile terminal performs the steps in the foregoing method embodiments.

Those skilled in the art can understand that all or part of the processes in the foregoing method embodiments may be completed by instructing the relevant hardware with computer-readable instructions. The computer-readable instructions may be stored in a non-transitory computer-readable storage medium. The computer-readable instructions, when executed, may implement the processes of the foregoing method embodiments. Any reference to memories, storage, databases or other media used in the embodiments provided in this application may include at least one of a non-transitory memory and a volatile memory. The non-volatile memory may include a read-only memory (ROM), a magnetic tape, a floppy disk, a flash memory or an optical memory. The volatile memory may include a random-access memory (RAM) or an external cache memory. As an illustration, but not a limitation, the RAM may be in many forms, such as a static random-access memory (SRAM) or a dynamic random access memory (DRAM).

The technical features of the foregoing embodiments may be combined arbitrarily. In order to make the description concise, all possible combinations of various technical features in the foregoing embodiments are not described completely. However, as long as there is no contradiction in the combination of these technical features, it is to be considered as the scope of this specification.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing embodiments only express several implementations of this application, and the descriptions are more specific and detailed, but cannot be understood as limiting the scope of the present disclosure. Those of ordinary skill in the art may also make several modifications and improvements without departing from the concept of this application, and these all fall within the protection scope of this application. Therefore, the protection scope of this application accords with the appended claims.

What is claimed is:

1. A method for pushing recommendation information when displaying a panoramic image, performed by a mobile terminal, the method comprising:
   determining a first partial image of a target panoramic image corresponding to a first position and orientation of the mobile terminal, wherein the target panoramic image is partitioned into multiple non-overlapping image intervals including a first image interval and a second image interval and each image interval has associated recommendation information;
   displaying the first partial image of the target panoramic image projected into a view finding region of the mobile terminal, wherein the first partial image is within the first image interval;
   causing a display of recommendation information configured for the first image interval;
   in response to a first spatial movement of the mobile terminal from the first position and orientation to a second position and orientation of the mobile terminal, determining a second partial image of the target panoramic image corresponding to the second position and orientation of the mobile terminal, wherein a displacement from the first partial image to the second partial image in the target panoramic image is proportional to the first spatial movement from the first position and orientation to a second position and orientation and the second partial image is within the second image interval;
   displaying the second partial image of the target panoramic image projected into the view finding region of the mobile terminal in replacement of the first partial image; and
   causing a display of recommendation information configured for the second image interval in replacement of the recommendation information configured for the first image interval.

2. The method according to claim 1, the method further comprising:
   pushing alternative recommendation information configured for the second image interval to replace the recommendation information displayed on the second partial image in response to an information updating trigger operation when there is no change to the second image interval after a predefined time duration.

3. The method according to claim 1, wherein the causing a display of recommendation information configured for the second image interval in replacement of the recommendation information configured for the first image interval comprises:
   replacing the first recommendation information configured for the first image interval to the second recommendation information configured for the second partial image in response to an information updating trigger operation when the first partial image projected into the view finding region is being replaced by the second partial image projected into the view finding region of the mobile terminal.

4. The method according to claim 1, wherein the causing a display of recommendation information configured for the second image interval in replacement of the recommendation information configured for the first image interval comprises:
   displaying the recommendation information configured for the second image interval on the second partial image in response to an information pushing trigger operation triggered during the display of the second partial image when the second partial image belongs to the second image interval of the target panoramic image.

5. The method according to claim 1, wherein the method further comprises:
canceling the display of the recommendation information on the second partial image in response to a movement of the mobile terminal in a target direction during the display of the recommendation information; and
replacing the display of the second partial image with an image for downloading an application corresponding to the recommendation information.

6. The method according to claim 1, wherein the recommendation information comprises a 3-dimension (3D) image, and the causing a display of recommendation information configured for the second image interval in replacement of the recommendation information configured for the first image interval comprises:
displaying a first perspective image of the 3D image projected into the view finding region on the second partial image; and
displaying a second perspective image of the 3D image projected into the view finding region in response to a perspective offset of the 3D image relative to the view finding region.

7. The method according to claim 1, wherein the method further comprises:
displaying a promotion information display page of a target application in response to a starting operation of the target application; and
the displaying a first partial image of a target panoramic image projected into a view finding region of the mobile terminal comprises:
displaying the first partial image of the target panoramic image projected into the view finding region in the promotion information display page.

8. The method according to claim 1, wherein the method further comprises:
displaying a promotion information display region in an information flow display page of a target application; and
the displaying a first partial image of a target panoramic image projected into a view finding region of the mobile terminal comprises:
displaying the first partial image of the target panoramic image projected into the view finding region in the promotion information display region.

9. The method according to claim 1, wherein the method further comprises:
displaying candidate panoramic image identifiers in a display page of the mobile terminal; and
the displaying a first partial image of a target panoramic image projected into a view finding region of the mobile terminal comprises:
displaying the first partial image of the target panoramic image projected into the view finding region in response to a selecting operation for the target panoramic image identifier in the candidate panoramic image identifiers, wherein the target panoramic image identifier is an image identifier of the target panoramic image.

10. A mobile terminal, comprising a memory and a processor, the memory storing computer-readable instructions, wherein the computer-readable instructions, when executed by the processor, cause the mobile terminal to perform a method for pushing recommendation information when displaying a panoramic image, the method including:
determining a first partial image of a target panoramic image corresponding to a first position and orientation of the mobile terminal, wherein the target panoramic image is partitioned into multiple non-overlapping image intervals including a first image interval and a second image interval and each image interval has associated recommendation information;
displaying the first partial image of the target panoramic image projected into a view finding region of the mobile terminal, wherein the first partial image is within the first image interval;
causing a display of recommendation information configured for the first image interval;
in response to a first spatial movement of the mobile terminal from the first position and orientation to a second position and orientation of the mobile terminal, determining a second partial image of the target panoramic image corresponding to the second position and orientation of the mobile terminal, wherein a displacement from the first partial image to the second partial image in the target panoramic image is proportional to the first spatial movement from the first position and orientation to a second position and orientation and the second partial image is within the second image interval;
displaying the second partial image of the target panoramic image projected into the view finding region of the mobile terminal in replacement of the first partial image; and
causing a display of recommendation information configured for the second image interval in replacement of the recommendation information configured for the first image interval.

11. The mobile terminal according to claim 10, wherein the method further comprises:
pushing alternative recommendation information configured for the second image interval to replace the recommendation information displayed on the second partial image in response to an information updating trigger operation when there is no change to the second image interval after a predefined time duration.

12. The mobile terminal according to claim 10, wherein the causing a display of recommendation information configured for the second image interval in replacement of the recommendation information configured for the first image interval comprises:
replacing the first recommendation information configured for the first image interval to the second recommendation information configured for the second partial image in response to an information updating trigger operation when the first partial image projected into the view finding region is being replaced by the second partial image projected into the view finding region of the mobile terminal.

13. The mobile terminal according to claim 10, wherein the causing a display of recommendation information configured for the second image interval in replacement of the recommendation information configured for the first image interval comprises:
displaying the recommendation information configured for the second image interval on the second partial image in response to an information pushing trigger operation triggered during the display of the second partial image when the second partial image belongs to the second image interval of the target panoramic image.

14. The mobile terminal according to claim 10, wherein the method further comprises:
- canceling the display of the recommendation information on the second partial image in response to a movement of the mobile terminal in a target direction during the display of the recommendation information; and
- replacing the display of the second partial image with an image for downloading an application corresponding to the recommendation information.

15. The mobile terminal according to claim 10, wherein the recommendation information comprises a 3-dimension (3D) image, and the causing a display of recommendation information configured for the second image interval in replacement of the recommendation information configured for the first image interval comprises:
- displaying a first perspective image of the 3D image projected into the view finding region on the second partial image; and
- displaying a second perspective image of the 3D image projected into the view finding region in response to a perspective offset of the 3D image relative to the view finding region.

16. The mobile terminal according to claim 10, wherein the method further comprises:
- displaying a promotion information display page of a target application in response to a starting operation of the target application; and
- the displaying a first partial image of a target panoramic image projected into a view finding region of the mobile terminal comprises:
- displaying the first partial image of the target panoramic image projected into the view finding region in the promotion information display page.

17. The mobile terminal according to claim 10, wherein the method further comprises:
- displaying a promotion information display region in an information flow display page of a target application; and
- the displaying a first partial image of a target panoramic image projected into a view finding region of the mobile terminal comprises:
- displaying the first partial image of the target panoramic image projected into the view finding region in the promotion information display region.

18. The mobile terminal according to claim 10, wherein the method further comprises:
- displaying candidate panoramic image identifiers in a display page of the mobile terminal; and
- the displaying a first partial image of a target panoramic image projected into a view finding region of the mobile terminal comprises:
- displaying the first partial image of the target panoramic image projected into the view finding region in response to a selecting operation for the target panoramic image identifier in the candidate panoramic image identifiers, wherein the target panoramic image identifier is an image identifier of the target panoramic image.

19. A non-transitory computer-readable storage medium, storing computer-readable instructions, wherein the computer-readable instructions, when executed by a processor of a mobile terminal, cause the mobile terminal to perform a method for pushing recommendation information when displaying a panoramic image, the method including:
- determining a first partial image of a target panoramic image corresponding to a first position and orientation of the mobile terminal, wherein the target panoramic image is partitioned into multiple non-overlapping image intervals including a first image interval and a second image interval and each image interval has associated recommendation information;
- displaying the first partial image of the target panoramic image projected into a view finding region of the mobile terminal, wherein the first partial image is within the first image interval;
- causing a display of recommendation information configured for the first image interval;
- in response to a first spatial movement of the mobile terminal from the first position and orientation to a second position and orientation of the mobile terminal, determining a second partial image of the target panoramic image corresponding to the second position and orientation of the mobile terminal, wherein a displacement from the first partial image to the second partial image in the target panoramic image is proportional to the first spatial movement from the first position and orientation to a second position and orientation and the second partial image is within the second image interval;
- displaying the second partial image of the target panoramic image projected into the view finding region of the mobile terminal in replacement of the first partial image; and
- causing a display of recommendation information configured for the second image interval in replacement of the recommendation information configured for the first image interval.

* * * * *